(12) United States Patent
Hasek

(10) Patent No.: US 9,961,383 B2
(45) Date of Patent: May 1, 2018

(54) METHODS AND APPARATUS FOR BUSINESS-BASED NETWORK RESOURCE ALLOCATION

(71) Applicant: TIME WARNER CABLE ENTERPRISES LLC, New York, NY (US)

(72) Inventor: Charles A. Hasek, Broomfield, CO (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days. days.

(21) Appl. No.: 14/462,339

(22) Filed: Aug. 18, 2014

(65) Prior Publication Data
US 2015/0082362 A1 Mar. 19, 2015

Related U.S. Application Data

(63) Continuation of application No. 12/072,637, filed on Feb. 26, 2008, now Pat. No. 8,813,143.

(51) Int. Cl.
*H04N 21/2543* (2011.01)
*H04N 21/258* (2011.01)
(Continued)

(52) U.S. Cl.
CPC ... *H04N 21/25435* (2013.01); *H04N 7/17336* (2013.01); *H04N 21/238* (2013.01);
(Continued)

(58) Field of Classification Search
CPC .......... H04N 21/2662; H04N 21/2385; H04N 21/238; H04N 21/25825; H04N 21/25833; H04N 21/25841
See application file for complete search history.

(56) References Cited

U.S. PATENT DOCUMENTS 4,521,881 A 6/1985 Stapleford et al.
4,546,382 A 10/1985 McKenna et al.
(Continued)

FOREIGN PATENT DOCUMENTS

CA 2643806 C 6/2013
WO WO-0110125 A1 2/2001
(Continued)

OTHER PUBLICATIONS

Cisco Intelligent Network Architecture for Digital Video—SCTE Cable-Tec Expo 2004 information page, Orange County Convention Center, Jun. 2004, 24 pages.
(Continued)

*Primary Examiner* — Robert J Hance
(74) *Attorney, Agent, or Firm* — Gazdzinski & Associates, PC

(57) ABSTRACT

Methods and apparatus for optimizing the distribution and delivery of content within a content-based network based on e.g., business or revenue considerations. In one embodiment, the network comprises a cable television network that utilizes a Global Session Resource Manager (GSRM). The GSRM processes subscriber program viewing requests to identify options available to fulfill the request (including, e.g., providing free on-demand (FOD), standard definition on-demand (SVOD), and/or high definition on-demand (HDVOD) content), and evaluate these options to determine the one that optimizes network revenue or profit. The GSRM performs this identification and evaluation process by considering various parameters including network resource (e.g., bandwidth) availability, and different revenue and profit implications for different classes of service, the individual or collective demographic or other profile of network subscribers, and other business or operational rules pro-
(Continued)

grammed by the operator of the network. Business methods based on such network optimization are also described.

28 Claims, 13 Drawing Sheets

(51) Int. Cl.
| | | |
|---|---|---|
| H04N 21/238 | (2011.01) | |
| H04N 7/173 | (2011.01) | |
| H04N 21/2343 | (2011.01) | |
| H04N 21/2385 | (2011.01) | |
| H04N 21/472 | (2011.01) | |
| H04N 21/61 | (2011.01) | |

(52) U.S. Cl.
CPC ... *H04N 21/2385* (2013.01); *H04N 21/23439* (2013.01); *H04N 21/2543* (2013.01); *H04N 21/25825* (2013.01); *H04N 21/25833* (2013.01); *H04N 21/25841* (2013.01); *H04N 21/25883* (2013.01); *H04N 21/472* (2013.01); *H04N 21/6118* (2013.01)

(56) References Cited

U.S. PATENT DOCUMENTS

| | | | |
|---|---|---|---|
| 4,602,279 A | 7/1986 | Freeman | |
| 4,930,120 A | 5/1990 | Baxter et al. | |
| 5,155,591 A | 10/1992 | Wachob | |
| 5,313,454 A | 5/1994 | Bustini et al. | |
| 5,600,364 A | 2/1997 | Hendricks et al. | |
| RE35,651 E | 11/1997 | Bradley et al. | |
| 5,734,380 A | 3/1998 | Adams et al. | |
| 5,758,257 A | 5/1998 | Herz et al. | |
| 5,774,170 A | 6/1998 | Hite et al. | |
| 5,793,410 A | 8/1998 | Rao | |
| 5,815,662 A | 9/1998 | Ong | |
| 5,862,312 A | 1/1999 | Mann et al. | |
| 5,878,324 A | 3/1999 | Borth et al. | |
| 5,886,995 A | 3/1999 | Arsenault et al. | |
| 5,914,945 A | 6/1999 | Abu-Amara et al. | |
| 5,926,205 A | 7/1999 | Krause et al. | |
| 5,935,206 A | 8/1999 | Dixon et al. | |
| 5,963,844 A | 10/1999 | Dail | |
| 6,002,393 A | 12/1999 | Hite et al. | |
| 6,047,327 A | 4/2000 | Tso et al. | |
| 6,081,830 A | 6/2000 | Schindler | |
| 6,092,178 A | 7/2000 | Jindal et al. | |
| 6,105,134 A | 8/2000 | Pinder et al. | |
| 6,124,878 A | 9/2000 | Adams et al. | |
| 6,128,316 A | 10/2000 | Takeda et al. | |
| 6,134,532 A | 10/2000 | Lazarus et al. | |
| 6,157,377 A | 12/2000 | Shah-Nazaroff et al. | |
| 6,161,142 A | 12/2000 | Wolfe et al. | |
| 6,167,432 A | 12/2000 | Jiang | |
| 6,169,728 B1 | 1/2001 | Perreault et al. | |
| 6,175,856 B1 | 1/2001 | Riddle | |
| 6,182,050 B1 | 1/2001 | Ballard | |
| 6,211,869 B1 | 4/2001 | Loveman et al. | |
| 6,211,901 B1 | 4/2001 | Imajima et al. | |
| 6,216,129 B1 | 4/2001 | Eldering | |
| 6,216,152 B1 | 4/2001 | Wong et al. | |
| 6,219,710 B1 | 4/2001 | Gray et al. | |
| 6,219,840 B1 | 4/2001 | Corrigan et al. | |
| 6,240,243 B1 | 5/2001 | Chen et al. | |
| 6,240,553 B1 | 5/2001 | Son et al. | |
| 6,249,680 B1 | 6/2001 | Wax et al. | |
| 6,252,964 B1 | 6/2001 | Wasilewski et al. | |
| 6,256,393 B1 | 7/2001 | Safadi et al. | |
| 6,330,609 B1 | 12/2001 | Garofalakis et al. | |
| 6,337,715 B1 | 1/2002 | Inagaki et al. | |
| 6,345,279 B1 | 2/2002 | Li et al. | |
| 6,353,626 B1 | 3/2002 | Sunay et al. | |
| 6,378,130 B1 | 4/2002 | Adams | |
| 6,434,141 B1 | 8/2002 | Oz et al. | |
| 6,446,261 B1 | 9/2002 | Rosser | |
| 6,463,508 B1 | 10/2002 | Wolf et al. | |
| 6,463,585 B1 | 10/2002 | Hendricks et al. | |
| 6,498,783 B1 | 12/2002 | Lin | |
| 6,502,139 B1 | 12/2002 | Birk et al. | |
| 6,516,412 B2 | 2/2003 | Wasilewski et al. | |
| 6,560,578 B2 | 5/2003 | Eldering | |
| 6,590,865 B1 | 7/2003 | Ibaraki et al. | |
| 6,594,699 B1 | 7/2003 | Sahai et al. | |
| 6,601,237 B1 | 7/2003 | Ten et al. | |
| 6,604,138 B1 | 8/2003 | Virine et al. | |
| 6,615,039 B1 | 9/2003 | Eldering | |
| 6,615,251 B1 | 9/2003 | Klug et al. | |
| 6,651,103 B1 | 11/2003 | Markowitz et al. | |
| 6,671,736 B2 | 12/2003 | Virine et al. | |
| 6,687,735 B1 | 2/2004 | Logston et al. | |
| 6,700,624 B2 | 3/2004 | Yun | |
| 6,711,148 B1 | 3/2004 | Hills | |
| 6,718,551 B1 | 4/2004 | Swix et al. | |
| 6,725,459 B2 | 4/2004 | Bacon | |
| 6,728,269 B1 | 4/2004 | Godwin et al. | |
| 6,728,840 B1 | 4/2004 | Shatil et al. | |
| 6,738,978 B1 | 5/2004 | Hendricks et al. | |
| 6,742,187 B1 | 5/2004 | Vogel | |
| 6,745,245 B1 | 6/2004 | Carpenter | |
| 6,763,391 B1 | 7/2004 | Ludtke | |
| 6,771,290 B1 | 8/2004 | Hoyle | |
| 6,772,435 B1 | 8/2004 | Thexton et al. | |
| 6,775,843 B1 | 8/2004 | McDermott | |
| 6,799,196 B1 | 9/2004 | Smith | |
| 6,842,783 B1 | 1/2005 | Boivie et al. | |
| 6,859,839 B1 | 2/2005 | Zahorjan et al. | |
| 6,868,439 B2 | 3/2005 | Basu et al. | |
| 6,891,841 B2 | 5/2005 | Leatherbury et al. | |
| 6,898,800 B2 | 5/2005 | Son et al. | |
| 6,917,628 B2 | 7/2005 | McKinnin et al. | |
| 6,944,166 B1 | 9/2005 | Perinpanathan et al. | |
| 6,948,183 B1 | 9/2005 | Peterka | |
| 6,961,430 B1 | 11/2005 | Gaske et al. | |
| 6,977,691 B1 | 12/2005 | Middleton et al. | |
| 6,981,045 B1 | 12/2005 | Brooks | |
| 6,985,934 B1 | 1/2006 | Armstrong et al. | |
| 6,986,156 B1 | 1/2006 | Rodriguez et al. | |
| 7,010,801 B1 | 3/2006 | Jerding et al. | |
| 7,024,461 B1 | 4/2006 | Janning et al. | |
| 7,024,676 B1 | 4/2006 | Klopfenstein | |
| 7,027,460 B2 | 4/2006 | Iyer et al. | |
| 7,039,116 B1 | 5/2006 | Zhang et al. | |
| 7,039,169 B2 | 5/2006 | Jones | |
| 7,039,614 B1 | 5/2006 | Candelore | |
| 7,039,938 B2 | 5/2006 | Candelore | |
| 7,047,309 B2 | 5/2006 | Baumann et al. | |
| 7,058,387 B2 | 6/2006 | Kumar et al. | |
| 7,069,573 B1 | 6/2006 | Brooks et al. | |
| 7,075,945 B2 | 7/2006 | Arsenault et al. | |
| 7,086,077 B2 | 8/2006 | Giammaressi | |
| 7,089,577 B1 | 8/2006 | Rakib et al. | |
| 7,093,272 B1 | 8/2006 | Shah-Nazaroff et al. | |
| 7,100,183 B2 | 8/2006 | Kunkel et al. | |
| 7,103,906 B1 | 9/2006 | Katz et al. | |
| 7,107,462 B2 | 9/2006 | Fransdonk | |
| 7,110,457 B1 | 9/2006 | Chen et al. | |
| 7,127,619 B2 | 10/2006 | Unger et al. | |
| 7,133,837 B1 | 11/2006 | Barnes, Jr. | |
| 7,143,431 B1 | 11/2006 | Eager et al. | |
| 7,146,627 B1 | 12/2006 | Ismail et al. | |
| 7,152,237 B2 | 12/2006 | Flickinger et al. | |
| 7,155,508 B2 | 12/2006 | Sankuratripati et al. | |
| 7,174,385 B2 | 2/2007 | Li | |
| 7,178,161 B1 | 2/2007 | Fristoe et al. | |
| 7,181,010 B2 | 2/2007 | Russ et al. | |
| 7,181,760 B1 | 2/2007 | Wallace | |
| 7,191,461 B1 | 3/2007 | Arsenault et al. | |
| 7,194,752 B1 | 3/2007 | Kenyon et al. | |
| 7,194,756 B2 | 3/2007 | Addington et al. | |
| 7,200,788 B2 | 4/2007 | Hiraki et al. | |
| 7,203,940 B2 | 4/2007 | Barmettler et al. | |
| 7,207,055 B1 | 4/2007 | Hendricks et al. | |

(56) References Cited

U.S. PATENT DOCUMENTS

| | | | |
|---|---|---|---|
| 7,216,265 B2 | 5/2007 | Hughes et al. |
| 7,225,164 B1 | 5/2007 | Candelore et al. |
| 7,225,458 B2 | 5/2007 | Klauss et al. |
| 7,228,555 B2 | 6/2007 | Schlack |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,246,366 B1 | 7/2007 | Addington et al. |
| 7,254,608 B2 | 8/2007 | Yeager et al. |
| 7,257,650 B2 | 8/2007 | MacIesowicz |
| 7,266,198 B2 | 9/2007 | Medvinsky |
| 7,266,611 B2 | 9/2007 | Jabri et al. |
| 7,266,726 B1 | 9/2007 | Ladd et al. |
| 7,283,782 B2 | 10/2007 | Sinnarajah et al. |
| 7,296,074 B2 | 11/2007 | Jagels |
| 7,305,691 B2 | 12/2007 | Cristofalo |
| 7,308,415 B2 | 12/2007 | Kimbrel et al. |
| 7,317,728 B2 | 1/2008 | Acharya et al. |
| 7,320,134 B1 | 1/2008 | Tomsen et al. |
| 7,325,073 B2 | 1/2008 | Shao et al. |
| 7,327,692 B2 | 2/2008 | Ain et al. |
| 7,334,044 B1 | 2/2008 | Allen |
| 7,340,759 B1 | 3/2008 | Rodriguez |
| 7,346,688 B2 | 3/2008 | Allen et al. |
| 7,352,775 B2 | 4/2008 | Powell |
| 7,355,980 B2 | 4/2008 | Bauer et al. |
| 7,363,371 B2 | 4/2008 | Kirby et al. |
| 7,370,120 B2 | 5/2008 | Kirsch et al. |
| 7,376,386 B2 | 5/2008 | Phillips et al. |
| 7,379,494 B2 | 5/2008 | Raleigh et al. |
| 7,403,618 B2 | 7/2008 | Van et al. |
| 7,434,245 B1 | 10/2008 | Shiga et al. |
| 7,464,179 B2 | 12/2008 | Hodges et al. |
| 7,567,565 B2 | 7/2009 | La |
| 7,577,118 B2 | 8/2009 | Haumonte et al. |
| 7,602,820 B2 | 10/2009 | Helms et al. |
| 7,617,516 B2 | 11/2009 | Huslak et al. |
| 7,630,401 B2 | 12/2009 | Iwamura |
| 7,690,020 B2 | 3/2010 | Lebar |
| 7,757,251 B2 | 7/2010 | Gonder et al. |
| 7,783,316 B1 | 8/2010 | Mitchell |
| 7,805,052 B2 | 9/2010 | Nakamura et al. |
| 7,836,178 B1 | 11/2010 | Bedell et al. |
| 7,930,715 B2 | 4/2011 | Hendricks et al. |
| 7,954,131 B2 | 5/2011 | Cholas et al. |
| 8,041,785 B2 | 10/2011 | Mazur et al. |
| 8,084,792 B2 | 12/2011 | Lehmann et al. |
| 8,156,520 B2 | 4/2012 | Casagrande et al. |
| 8,170,065 B2 | 5/2012 | Hasek et al. |
| 8,306,634 B2 | 11/2012 | Nguyen et al. |
| 8,341,242 B2 | 12/2012 | Dillon et al. |
| 8,365,212 B1 | 1/2013 | Orlowski |
| 8,442,265 B1 | 5/2013 | Bosworth et al. |
| 8,458,125 B1* | 6/2013 | Chong, Jr. ........ G06F 17/30899 |
| | | 707/610 |
| 8,468,099 B2 | 6/2013 | Headings et al. |
| 8,583,484 B1 | 11/2013 | Chalawsky et al. |
| 8,713,623 B2 | 4/2014 | Brooks |
| 8,726,303 B2 | 5/2014 | Ellis, III |
| 8,862,155 B2 | 10/2014 | Stern et al. |
| 8,866,911 B1 | 10/2014 | Sivertsen |
| 8,898,270 B1 | 11/2014 | Stack et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,215,423 B2 | 12/2015 | Kimble et al. |
| 2001/0013123 A1 | 8/2001 | Freeman et al. |
| 2001/0030785 A1 | 10/2001 | Pangrac et al. |
| 2001/0050901 A1* | 12/2001 | Love ........................ H04L 43/00 |
| | | 370/235 |
| 2002/0004912 A1* | 1/2002 | Fung ...................... G06F 1/3203 |
| | | 713/300 |
| 2002/0019984 A1 | 2/2002 | Rakib |
| 2002/0032754 A1 | 3/2002 | Logston et al. |
| 2002/0049902 A1 | 4/2002 | Rhodes |
| 2002/0049980 A1 | 4/2002 | Hoang |
| 2002/0053082 A1 | 5/2002 | Weaver et al. |
| 2002/0054589 A1 | 5/2002 | Ethridge et al. |
| 2002/0059577 A1 | 5/2002 | Lu et al. |
| 2002/0059619 A1 | 5/2002 | Lebar |
| 2002/0063621 A1 | 5/2002 | Tseng et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100059 A1 | 7/2002 | Buehl et al. |
| 2002/0104083 A1 | 8/2002 | Hendricks et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129378 A1 | 9/2002 | Cloonan et al. |
| 2002/0144262 A1* | 10/2002 | Plotnick ............... G11B 27/005 |
| | | 725/32 |
| 2002/0144263 A1 | 10/2002 | Eldering et al. |
| 2002/0147771 A1 | 10/2002 | Traversat et al. |
| 2002/0152299 A1 | 10/2002 | Traversat et al. |
| 2002/0154655 A1 | 10/2002 | Gummalla et al. |
| 2002/0162109 A1 | 10/2002 | Shteyn |
| 2002/0162115 A1 | 10/2002 | Bruckner et al. |
| 2002/0163928 A1 | 11/2002 | Rudnick et al. |
| 2002/0166119 A1 | 11/2002 | Cristofalo |
| 2002/0170057 A1 | 11/2002 | Barrett et al. |
| 2002/0178447 A1 | 11/2002 | Plotnick et al. |
| 2002/0196939 A1 | 12/2002 | Unger et al. |
| 2003/0002862 A1 | 1/2003 | Rodriguez et al. |
| 2003/0004810 A1 | 1/2003 | Eldering |
| 2003/0005453 A1 | 1/2003 | Rodriguez et al. |
| 2003/0007516 A1 | 1/2003 | Abramov et al. |
| 2003/0021412 A1 | 1/2003 | Candelore et al. |
| 2003/0023981 A1 | 1/2003 | Lemmons |
| 2003/0025832 A1 | 2/2003 | Swart et al. |
| 2003/0033199 A1 | 2/2003 | Coleman |
| 2003/0037331 A1 | 2/2003 | Lee |
| 2003/0046704 A1 | 3/2003 | Laksono et al. |
| 2003/0056217 A1 | 3/2003 | Brooks |
| 2003/0061619 A1 | 3/2003 | Giammaressi |
| 2003/0067554 A1 | 4/2003 | Klarfeld et al. |
| 2003/0071117 A1 | 4/2003 | Meade |
| 2003/0074565 A1 | 4/2003 | Wasilewski et al. |
| 2003/0077067 A1 | 4/2003 | Wu et al. |
| 2003/0088876 A1 | 5/2003 | Mao et al. |
| 2003/0093311 A1 | 5/2003 | Knowlson |
| 2003/0093784 A1 | 5/2003 | Dimitrova et al. |
| 2003/0093792 A1 | 5/2003 | Labeeb et al. |
| 2003/0095791 A1 | 5/2003 | Barton et al. |
| 2003/0101449 A1 | 5/2003 | Bentolila et al. |
| 2003/0101451 A1 | 5/2003 | Bentolila et al. |
| 2003/0110499 A1 | 6/2003 | Knudson et al. |
| 2003/0114162 A1 | 6/2003 | Chheda et al. |
| 2003/0115612 A1 | 6/2003 | Mao et al. |
| 2003/0118014 A1 | 6/2003 | Iyer et al. |
| 2003/0135860 A1 | 7/2003 | Dureau |
| 2003/0139980 A1 | 7/2003 | Hamilton |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0161473 A1 | 8/2003 | Fransdonk |
| 2003/0179773 A1 | 9/2003 | Mocek et al. |
| 2003/0182261 A1 | 9/2003 | Patterson |
| 2003/0195927 A1 | 10/2003 | Virine et al. |
| 2003/0214962 A1 | 11/2003 | Allaye-Chan et al. |
| 2003/0217365 A1 | 11/2003 | Caputo |
| 2003/0229681 A1 | 12/2003 | Levitan |
| 2004/0006625 A1 | 1/2004 | Saha et al. |
| 2004/0019691 A1 | 1/2004 | Daymond et al. |
| 2004/0031053 A1 | 2/2004 | Lim et al. |
| 2004/0045030 A1 | 3/2004 | Reynolds et al. |
| 2004/0078809 A1 | 4/2004 | Drazin |
| 2004/0103437 A1 | 5/2004 | Allegrezza et al. |
| 2004/0109672 A1 | 6/2004 | Kim et al. |
| 2004/0113936 A1* | 6/2004 | Dempski ............... G06Q 30/02 |
| | | 715/738 |
| 2004/0123313 A1 | 6/2004 | Koo et al. |
| 2004/0133907 A1 | 7/2004 | Rodriguez et al. |

(56) References Cited

U.S. PATENT DOCUMENTS

| | | |
|---|---|---|
| 2004/0146006 A1 | 7/2004 | Jackson |
| 2004/0158858 A1 | 8/2004 | Paxton et al. |
| 2004/0163109 A1 | 8/2004 | Kang et al. |
| 2004/0179605 A1 | 9/2004 | Lane |
| 2004/0181800 A1 | 9/2004 | Rakib et al. |
| 2004/0187150 A1 | 9/2004 | Gonder et al. |
| 2004/0187159 A1 | 9/2004 | Gaydos et al. |
| 2004/0193648 A1 | 9/2004 | Lai et al. |
| 2004/0193704 A1 | 9/2004 | Smith |
| 2004/0194134 A1 | 9/2004 | Gunatilake et al. |
| 2004/0226044 A1 | 11/2004 | Goode |
| 2004/0261114 A1 | 12/2004 | Addington et al. |
| 2004/0261116 A1 | 12/2004 | McKeown et al. |
| 2004/0267965 A1 | 12/2004 | Vasudevan et al. |
| 2005/0007278 A1 | 1/2005 | Anson et al. |
| 2005/0010697 A1 | 1/2005 | Kinawi et al. |
| 2005/0039205 A1 | 2/2005 | Riedl |
| 2005/0039206 A1 | 2/2005 | Opdycke |
| 2005/0041679 A1 | 2/2005 | Weinstein et al. |
| 2005/0047596 A1 | 3/2005 | Suzuki |
| 2005/0050160 A1 | 3/2005 | Upendran et al. |
| 2005/0055685 A1 | 3/2005 | Maynard et al. |
| 2005/0058115 A1 | 3/2005 | Levin et al. |
| 2005/0060742 A1 | 3/2005 | Riedl et al. |
| 2005/0060745 A1 | 3/2005 | Riedl et al. |
| 2005/0060758 A1 | 3/2005 | Park |
| 2005/0071669 A1 | 3/2005 | Medvinsky |
| 2005/0071882 A1 | 3/2005 | Rodriguez et al. |
| 2005/0086691 A1 | 4/2005 | Dudkiewicz et al. |
| 2005/0097598 A1 | 5/2005 | Pedlow, Jr. et al. |
| 2005/0108529 A1 | 5/2005 | Juneau |
| 2005/0111844 A1 | 5/2005 | Compton et al. |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0125528 A1 | 6/2005 | Burke et al. |
| 2005/0125832 A1 | 6/2005 | Jost et al. |
| 2005/0135476 A1 | 6/2005 | Gentric et al. |
| 2005/0168323 A1 | 8/2005 | Lenoir et al. |
| 2005/0176444 A1 | 8/2005 | Tanaka |
| 2005/0188415 A1 | 8/2005 | Riley |
| 2005/0198686 A1 | 9/2005 | Krause et al. |
| 2005/0223409 A1 | 10/2005 | Rautila et al. |
| 2005/0276284 A1 | 12/2005 | Krause et al. |
| 2005/0289618 A1* | 12/2005 | Hardin ............... H04L 47/15 725/95 |
| 2005/0289619 A1 | 12/2005 | Melby |
| 2006/0010075 A1 | 1/2006 | Wolf |
| 2006/0020984 A1 | 1/2006 | Ban et al. |
| 2006/0036750 A1 | 2/2006 | Ladd et al. |
| 2006/0037060 A1 | 2/2006 | Simms et al. |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0066632 A1 | 3/2006 | Wong et al. |
| 2006/0073843 A1 | 4/2006 | Aerrabotu et al. |
| 2006/0084417 A1 | 4/2006 | Melpignano et al. |
| 2006/0085824 A1 | 4/2006 | Bruck et al. |
| 2006/0088063 A1 | 4/2006 | Hartung et al. |
| 2006/0130107 A1 | 6/2006 | Gonder et al. |
| 2006/0130113 A1 | 6/2006 | Carlucci et al. |
| 2006/0133398 A1 | 6/2006 | Choi et al. |
| 2006/0133644 A1 | 6/2006 | Wells et al. |
| 2006/0154674 A1 | 7/2006 | Landschaft et al. |
| 2006/0165197 A1 | 7/2006 | Morita et al. |
| 2006/0171390 A1* | 8/2006 | La Joie ............... H04L 12/2801 370/390 |
| 2006/0171423 A1 | 8/2006 | Helms et al. |
| 2006/0197828 A1 | 9/2006 | Zeng et al. |
| 2006/0218601 A1 | 9/2006 | Michel |
| 2006/0218604 A1 | 9/2006 | Riedl et al. |
| 2006/0218632 A1 | 9/2006 | Corley et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0256376 A1 | 11/2006 | Hirooka |
| 2006/0271946 A1 | 11/2006 | Woundy et al. |
| 2006/0277569 A1 | 12/2006 | Smith |
| 2006/0291506 A1 | 12/2006 | Cain |
| 2007/0022459 A1 | 1/2007 | Gaebel et al. |
| 2007/0033531 A1 | 2/2007 | Marsh |
| 2007/0047449 A1 | 3/2007 | Berger et al. |
| 2007/0053293 A1 | 3/2007 | McDonald et al. |
| 2007/0061818 A1 | 3/2007 | Williams et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0094692 A1 | 4/2007 | De |
| 2007/0101157 A1 | 5/2007 | Faria |
| 2007/0101370 A1 | 5/2007 | Calderwood |
| 2007/0113243 A1 | 5/2007 | Brey |
| 2007/0118852 A1 | 5/2007 | Calderwood |
| 2007/0121569 A1 | 5/2007 | Fukui et al. |
| 2007/0121678 A1 | 5/2007 | Brooks et al. |
| 2007/0124781 A1 | 5/2007 | Casey et al. |
| 2007/0130581 A1 | 6/2007 | Del et al. |
| 2007/0153820 A1 | 7/2007 | Gould |
| 2007/0156539 A1 | 7/2007 | Yates |
| 2007/0157234 A1 | 7/2007 | Walker |
| 2007/0162927 A1 | 7/2007 | Ramaswamy et al. |
| 2007/0192794 A1 | 8/2007 | Curtis et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204313 A1 | 8/2007 | McEnroe et al. |
| 2007/0204314 A1 | 8/2007 | Hasek et al. |
| 2007/0217436 A1 | 9/2007 | Markley et al. |
| 2007/0223380 A1 | 9/2007 | Gilbert et al. |
| 2007/0233857 A1 | 10/2007 | Cheng et al. |
| 2007/0241176 A1 | 10/2007 | Epstein et al. |
| 2007/0250872 A1 | 10/2007 | Dua |
| 2007/0250880 A1 | 10/2007 | Hainline |
| 2007/0266395 A1 | 11/2007 | Lee et al. |
| 2007/0271386 A1 | 11/2007 | Kurihara et al. |
| 2007/0274400 A1* | 11/2007 | Murai ............... H04N 21/23430 375/240.26 |
| 2007/0276926 A1 | 11/2007 | Lajoie et al. |
| 2008/0016526 A1 | 1/2008 | Asmussen |
| 2008/0022012 A1 | 1/2008 | Wang |
| 2008/0052157 A1 | 2/2008 | Kadambi et al. |
| 2008/0066112 A1 | 3/2008 | Bailey et al. |
| 2008/0092181 A1 | 4/2008 | Britt |
| 2008/0098212 A1 | 4/2008 | Helms et al. |
| 2008/0098446 A1 | 4/2008 | Seckin et al. |
| 2008/0101460 A1 | 5/2008 | Rodriguez |
| 2008/0103903 A1 | 5/2008 | Flake et al. |
| 2008/0104634 A1 | 5/2008 | Gajdos et al. |
| 2008/0109307 A1 | 5/2008 | Ullah |
| 2008/0134156 A1 | 6/2008 | Osminer et al. |
| 2008/0134165 A1 | 6/2008 | Anderson et al. |
| 2008/0134274 A1 | 6/2008 | Derrenberger et al. |
| 2008/0141317 A1 | 6/2008 | Radloff et al. |
| 2008/0152316 A1 | 6/2008 | Sylvain |
| 2008/0155059 A1 | 6/2008 | Hardin et al. |
| 2008/0155614 A1 | 6/2008 | Cooper et al. |
| 2008/0182591 A1 | 7/2008 | Krikorian |
| 2008/0183705 A1 | 7/2008 | Shivaji-Rao et al. |
| 2008/0192820 A1 | 8/2008 | Brooks et al. |
| 2008/0201748 A1 | 8/2008 | Hasek et al. |
| 2008/0229354 A1 | 9/2008 | Morris et al. |
| 2008/0235732 A1 | 9/2008 | Han et al. |
| 2008/0235746 A1 | 9/2008 | Peters et al. |
| 2008/0244667 A1* | 10/2008 | Osborne ............ H04N 7/17318 725/94 |
| 2008/0271068 A1 | 10/2008 | Ou et al. |
| 2008/0273591 A1 | 11/2008 | Brooks et al. |
| 2009/0025027 A1* | 1/2009 | Craner ............... H04H 20/103 725/32 |
| 2009/0028182 A1 | 1/2009 | Brooks et al. |
| 2009/0064251 A1 | 3/2009 | Savoor et al. |

(56) References Cited

U.S. PATENT DOCUMENTS

| | | |
|---|---|---|
| 2009/0100459 A1 | 4/2009 | Riedl et al. |
| 2009/0170479 A1 | 7/2009 | Jarenskog |
| 2009/0210899 A1 | 8/2009 | Lawrence-Apfelbaum et al. |
| 2009/0244290 A1 | 10/2009 | McKelvey et al. |
| 2009/0254971 A1 | 10/2009 | Herz et al. |
| 2010/0014496 A1 | 1/2010 | Kalika et al. |
| 2010/0057560 A1 | 3/2010 | Skudlark et al. |
| 2010/0070867 A1 | 3/2010 | Lemmers |
| 2010/0081416 A1 | 4/2010 | Cohen |
| 2010/0122288 A1 | 5/2010 | Minter et al. |
| 2010/0150027 A1 | 6/2010 | Atwal et al. |
| 2010/0151816 A1 | 6/2010 | Besehanic et al. |
| 2010/0157928 A1 | 6/2010 | Spinar et al. |
| 2010/0159951 A1 | 6/2010 | Shkedi |
| 2010/0223491 A1 | 9/2010 | Ladd et al. |
| 2010/0251305 A1 | 9/2010 | Kimble et al. |
| 2010/0309051 A1 | 12/2010 | Moshfeghi |
| 2010/0313225 A1 | 12/2010 | Cholas et al. |
| 2011/0015989 A1 | 1/2011 | Tidwell et al. |
| 2011/0093900 A1 | 4/2011 | Patel et al. |
| 2011/0103374 A1 | 5/2011 | Lajoie et al. |
| 2011/0107389 A1 | 5/2011 | Chakarapani |
| 2011/0112717 A1 | 5/2011 | Resner |
| 2011/0138064 A1 | 6/2011 | Rieger et al. |
| 2011/0162007 A1 | 6/2011 | Karaoguz et al. |
| 2011/0163888 A1 | 7/2011 | Goedde |
| 2011/0167440 A1 | 7/2011 | Greenfield |
| 2011/0206136 A1 | 8/2011 | Bekedam et al. |
| 2011/0225619 A1 | 9/2011 | Kesireddy et al. |
| 2011/0235577 A1 | 9/2011 | Hintermeister et al. |
| 2011/0247029 A1 | 10/2011 | Yarvis et al. |
| 2011/0286437 A1 | 11/2011 | Austin et al. |
| 2012/0023522 A1 | 1/2012 | Anderson et al. |
| 2012/0023535 A1 | 1/2012 | Brooks et al. |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0159539 A1 | 6/2012 | Berberet et al. |
| 2012/0202447 A1 | 8/2012 | Edge et al. |
| 2012/0222081 A1 | 8/2012 | Schaefer et al. |
| 2012/0278841 A1 | 11/2012 | Hasek et al. |
| 2012/0302259 A1 | 11/2012 | Busch |
| 2012/0330759 A1 | 12/2012 | Aggarwal et al. |
| 2013/0045681 A1 | 2/2013 | Dua |
| 2013/0046623 A1 | 2/2013 | Moritz et al. |
| 2013/0081097 A1 | 3/2013 | Park et al. |
| 2013/0095848 A1 | 4/2013 | Gold et al. |
| 2013/0100818 A1 | 4/2013 | Qiu et al. |
| 2013/0227608 A1 | 8/2013 | Evans et al. |
| 2013/0254787 A1 | 9/2013 | Cox et al. |
| 2013/0325870 A1 | 12/2013 | Rouse et al. |
| 2014/0046624 A1 | 2/2014 | Miettinen |
| 2014/0066098 A1 | 3/2014 | Stern et al. |
| 2014/0189749 A1 | 7/2014 | Gordon et al. |
| 2014/0215506 A1 | 7/2014 | Kalmes et al. |
| 2014/0282721 A1 | 9/2014 | Kuncl et al. |
| 2014/0309868 A1 | 10/2014 | Ricci |
| 2014/0359649 A1 | 12/2014 | Cronk et al. |
| 2015/0058883 A1 | 2/2015 | Tidwell et al. |
| 2015/0058909 A1 | 2/2015 | Miller et al. |
| 2015/0103685 A1 | 4/2015 | Butchko et al. |
| 2015/0106846 A1 | 4/2015 | Chen et al. |
| 2015/0189377 A1 | 7/2015 | Wheatley et al. |
| 2015/0365833 A1 | 12/2015 | Stafford et al. |
| 2016/0019103 A1 | 1/2016 | Basra |
| 2016/0127185 A1 | 5/2016 | McAllister |

FOREIGN PATENT DOCUMENTS

| | | |
|---|---|---|
| WO | WO-0191474 A2 | 11/2001 |
| WO | WO-2004008693 A1 | 1/2004 |

OTHER PUBLICATIONS

Communications Technology: Next-Generation Bandwidth Management—The Evolution of the Anything-to-Anywhere Network by Yvette Kanouff, 8 pages, Apr. 1, 2004.

Motorola DOCSIS Cable Module DCM 2000 specifications, 4 pages, no date.

OpenVision Session Resource Manager—Open Standards-Based Solution Optimizes Network Resources by Dynamically Assigning Bandwidth in the Delivery of Digital Services article, 2 pages, (copyright 2006), http://www.imake.com/hopenvision).

Resource Planning and Bandwidth Allocation in Hybrid Fiber-Coax Residential Networks by David Griffith, et al., National Institute of Standards and Technology (NIST), 10 pages, no date.

Session Resource Manager features and information, 2 pages, no date http://www.imake.com/hopenvision).

Co-pending U.S. Appl. No. 14/959885, filed Dec. 4, 2015.

Co-pending U.S. Appl. No. 14/959948, filed Dec. 4, 2015.

Deering et al., Internet Protocol, Version 6 (Ipv6) Specification, IETF RFC 2460 (Dec. 1998).

Internet Protocol DARPA Internet Program Protocol Specification, IETF RFC 791 (Sep. 1981).

\* cited by examiner

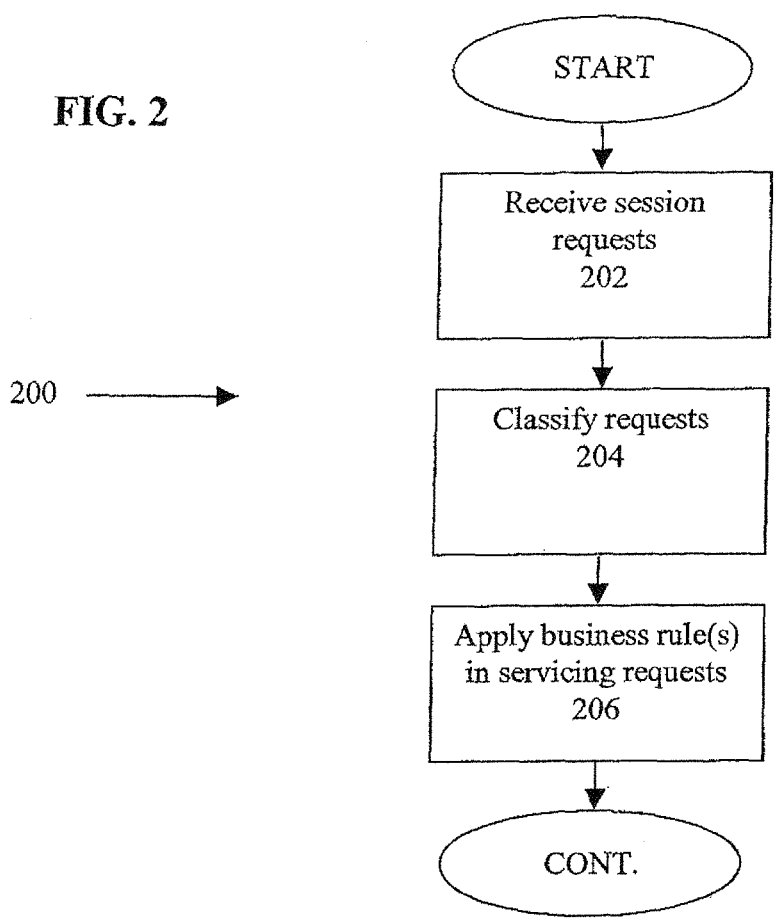

Before:

| VOD Service Group - 4 RF Channels | | | | QAM Bandwidth used |
|---|---|---|---|---|
| QAM1 | QAM2 | QAM3 | QAM4 | Mbps |
| 7 |  | 24 | ~~31~~ | 37.5 |
| 6 |  | 23 | 30 | 33.75 |
| 5 |  | 22 | 29 | 30 |
| 4 | 14 | 21 |  | 26.25 |
| 3 | ~~13~~ | 20 |  | 22.5 |
| 2 | 12 | 19 |  | 18.75 |
| | ~~11~~ | 18 | 28 | 15 |
| | 10 | 17 | 27 | 11.25 |
| | 9 | 16 | 26 | 7.5 |
| 1 | 8 | 15 | 25 | 3.75 |

⬆ GSRM, Trumping

After:

| VOD Service Group - 4 RF Channels | | | | QAM Bandwidth used |
|---|---|---|---|---|
| QAM1 | QAM2 | QAM3 | QAM4 | Mbps |
| 7 |  | 24 | 17 | 37.5 |
| 6 |  | 23 | 30 | 33.75 |
| 5 |  | 22 | 29 | 30 |
| 4 | 14 | 21 | | 26.25 |
| 3 | 16 | 20 | | 22.5 |
| 2 | 12 | 19 | | 18.75 |
| | 15 | *New HD Channel* | 28 | 15 |
| | 10 | | 27 | 11.25 |
| | 9 | | 26 | 7.5 |
| 1 | 8 | | 25 | 3.75 |

FIG. 4B

METHODS AND APPARATUS FOR BUSINESS-BASED NETWORK RESOURCE ALLOCATION

PRIORITY AND RELATED APPLICATIONS

This application is a continuation of and claims priority to U.S. patent application Ser. No. 12/072,637 filed Feb. 26, 2008 and issuing as U.S. Pat. No. 8,813,143 on Aug. 19, 2014 of the same title, and incorporated herein by reference in its entirety. The present application is related to co-owned and co-pending U.S. patent application Ser. No. 12/284,757 filed on Sep. 24, 2008 entitled "METHODS AND APPARATUS FOR USER-BASED TARGETED CONTENT DELIVERY" and which claims priority to U.S. provisional patent application Ser. No. 60/995,655, also entitled "METHODS AND APPARATUS FOR USER-BASED TARGETED CONTENT DELIVERY" filed on Sep. 26, 2007; co-owned and co-pending U.S. patent application Ser. No. 11/974,700, entitled "METHODS AND APPARATUS FOR REVENUE-OPTIMIZED DELIVERY OF CONTENT IN A NETWORK", filed on Oct. 15, 2007 and issued as U.S. Pat. No. 8,099,757 on Jan. 17, 2012, and Ser. No. 10/881,979 filed Jun. 29, 2004 and entitled "METHOD AND APPARATUS FOR NETWORK BANDWIDTH ALLOCATION", each of the foregoing incorporated herein by reference in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of multimedia content delivery, and specifically in one aspect to using available bandwidth on a content delivery network such as a cable television network in order to both optimize network operator revenue and delivery of video services to network subscribers.

2. Description of Related Technology

Modern content delivery networks such as cable television or satellite networks typically include a variety of different content and data delivery modes and associated infrastructure. For example, the typical cable television network may include a Video on Demand (VOD) portion, a broadcast delivery portion (e.g., broadcast switched architecture, such as that described on co-owned and co-pending U.S. patent application Ser. No. 09/956,688 filed Sep. 20, 2001 and entitled "Technique For Effectively Providing Program Material In A Cable Television System", incorporated herein by reference in its entirety), DOCSIS cable modem capability, voice-over-IP (VoIP) packetized telephony, and so forth.

One significant competitive challenge presently faced by operators of content-based delivery networks relates to managing and conserving downstream bandwidth. This management and conservation includes the reclamation of otherwise under-utilized or unused bandwidth such that the service and/or customer base can be expanded without significant modifications or build-outs of the underlying network infrastructure. For example, it is desirable to expand the types and availability of "next-generation" network services, including high-definition (HD) broadcast, VOD, high-speed data, VoIP, Interactive TV, etc. over time, without the need for major capital expenditures or system modifications. Hence, network operators are increasingly focused on techniques for "squeezing" as much capacity out of their existing networks as possible.

VOD and Session Resource Managers—

Providing "on-demand" (OD) services, such as e.g., video on-demand or VOD, is well known within content-based networks. In a typical configuration, the VOD service makes available to its users a selection of multiple video programs that they can choose from and watch over a network connection with minimum setup delay. At a high level, a VOD system consists of one or more VOD servers that pass and/or store the relevant content; one or more network connections that are used for program selection and program delivery; and customer premises equipment (CPE) to receive, decode and present the video on a display unit. The content is typically distributed to the CPE over a Hybrid Fiber Coaxial (HFC) network.

Depending on the type of content made available and rate structure for viewing, a particular VOD service could be called "subscription video-on-demand (SVOD)" that gives customers on-demand access to the content for a flat monthly fee, "free video-on-demand (FVOD)" that gives customers free on-demand access to some content, "movies on-demand" where VOD content consists of movies only, and so forth. Additionally, VOD content may comprise high-definition video (e.g., HDVOD), which may be charged for example on a per-usage basis. Many of these services, although referred to by names different than VOD, still share many of the same basic attributes including storage, network and decoder technologies.

On-demand infrastructure within networks has also been adapted to the delivery of data such as computer files and the like; see, e.g., co-owned and co-pending U.S. patent application Ser. No. 11/013,665 filed Dec. 15, 2004 entitled "METHOD AND APPARATUS FOR HIGH BANDWIDTH DATA TRANSMISSION IN CONTENT-BASED NETWORKS", incorporated herein by reference in its entirety, for one exemplary high-speed data download approach using on-demand infrastructure within a content-based network.

Just as different varieties of on-demand service offerings have evolved over time, several different network architectures have also evolved for deploying these services. These architectures range from fully centralized (e.g., VOD servers at a central location) to fully distributed (e.g., multiple copies of content distributed on VOD servers very close to the "edge" or customer premises), as well as various other network architectures there between. Since most cable television networks today consist of optical fiber towards the "core" of the network which are connected to coaxial cable networks towards the "edge", VOD transmission network architectures also consist of a mixture of optical fiber and coaxial cable portions.

The CPE for VOD often consists of a digital cable set-top box (DSTB) that provides the functions of receiving cable signals by tuning to the appropriate RF channel, processing the received signal and outputting VOD signals for viewing on a display unit. Such a digital set-top box also typically hosts a VOD application that enables user interaction for navigation and selection of VOD menu.

While the architectural details of how video is transported in the core HFC network can be different for each VOD deployment, each generally will have a transition point where the video signals are modulated, upconverted to the appropriate RF channel and sent over the coaxial segment(s) of the network. Depending on the topology of the individual cable plant, this could be performed at a node, hub or a headend. The coaxial cable portion of the network is variously referred to as the "access network" or "edge network" or "last mile network."

In U.S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services. For this reason, the exact RF channel used for VOD service may differ from plant to plant. However, within a given cable plant, all homes that are electrically connected to the same cable feed running through a neighborhood will receive the same downstream signal. For the purpose of managing VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group typically consists of homes receiving VOD signals over the same 4 RF channels. Reasons for this grouping include (i) that it lends itself to a desirable "symmetry of two" design of products (e.g. Scientific Atlanta's MQAM), and (ii) a simple mapping from incoming Asynchronous Serial Interface (ASI) payload rate of 213 Mbps to four QAM payload rates.

In most cable networks, VOD programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. In many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group. These numbers work out very well for many deployment scenarios, such as the following example. A typical "service area" neighborhood served by a coaxial cable drop from the cable network consists of 2000 homes, of which about two-thirds are cable subscribers, of which about one-third are digital cable subscribers, of which about 10% peak simultaneous use is expected. Hence, the bandwidth required to meet VOD requirements is 2000×(⅔)×(⅓)×0.1=approximately 40 peak VOD sessions—the exact number supported by a 4 QAM service group.

The transport of data is handled by a function called the Session Resource Manager (SRM). When a new VOD session request is made, the SRM receives that request, allocates bandwidth on a downstream QAM, and sends the information back to the CPE that made the request so that it can tune to the right RF channel and the VOD program therein. Since the SRM controls mapping of incoming VOD session requests to QAM channels within the Service Group, it is an appropriate place for a network operator to enforce RF channel usage policy. In general, SRM should maximize availability of bandwidth to VOD sessions (by efficiently recycling bandwidth from expired sessions) and by ensuring some level of redundancy in case of equipment failure (e.g. a QAM modulator goes down).

More and more US households are beginning to purchase High Definition (HD) televisions (HDTV). By one estimate, by the end of 2004, over 12 million US households will have HDTV displays. To keep up with the trend, MSOs have begun offering HD television programs to cable customers and have recently started looking into deploying HD VOD services.

Entertainment-quality transmission of HD signals requires about four times as much bandwidth as SD. For an exemplary MPEG-2 Main Profile-High Level (MP@HL) video compression, each HD program requires around 15 Mbps bitrate. Although revenues from HD VOD service may not be four times the revenue from SD VOD service, the ability to offer HD VOD service is often critical to cable operators' strategy to be a leader in digital television service offerings.

Use of MPEG HD compression technology for initial deployment of HD VOD services is a logical choice, as HD VOD shares the same MPEG-2 transport layer technology. This approach allows reuse of most of the infrastructure deployed for SD VOD services. By using MPEG multiplexing techniques, SD and HD video streams can be simultaneously carried over the fiber side of the VOD network and multiplexed onto the same QAM channel in a service group. Since roughly 37.5 Mbps bandwidth is available on one QAM-256 carrier, cable operators can mix and match HD and SD VOD sessions using 3.75 Mbps per SD and 15 Mbps per HD VOD stream. For example, on a single QAM carrier, maximum 2 HD VOD sessions can be offered adding up to an aggregate 30 Mbps, with the other 7.5 Mbps being used by 2 SD sessions.

It should be recognized that under prevailing network and CPE design practices, the bandwidth required by a video stream cannot be spread over two QAM carriers. For example, when a new HD VOD session request is granted, all 15 Mbps of bandwidth must be made available on a single QAM carrier.

The role of the aforementioned SRM becomes even more important when managing a Service Group for simultaneous HD and SD VOD sessions. It has the additional task to map VOD sessions to QAM carriers such that it can ensure sufficient bandwidth block for HD VOD session on a QAM carrier in that Service Group. The method used for this mapping should at the same time be able to maximize the amount of bandwidth used without leaving bandwidth stranded on a QAM carrier. Since HD VOD takes much more bandwidth that SD video, during the introduction phase, a cable operator may wish to limit maximum number of sessions of either kind (SD or HD) allowed within a Service Group. Clearly, this number should be easily changeable (upward or downward) if business economics or other considerations demand it.

Business Considerations Relating to Network Operation—

The choice of multiple services a network operator can provide to the subscribers (e.g., broadcast, VOD, PVR/DVR, DOCSIS, VoIP, etc.) gives rise to new opportunities in terms of how to use incremental available bandwidth so as to best maximize the operator's revenue or profit. One such source of revenue or profit is third party advertising. Accordingly, the type and distribution of such advertising is a very significant determinant of network operator revenue/profits.

In conventional cable networks, advertisement revenues depend largely on the footprint of the network and the number of subscribers. Advertisements or similar promotional content may be inserted at the national level, or locally (e.g., by the network operator). The revenues generated are determined in large part based on the program stream into which the advertisements are inserted, and the time of delivery (e.g., prime-time). Advertisers may know for example that a target demographic, such as 18-30 year-old females, has a very high viewership for a certain program at a certain time. Hence, their advertisement will likely obtain a high number of "looks" or impressions, and accordingly their likely benefits in terms of such 18-30 year-old females buying their products will be higher. Accordingly, the price that can be charged for such advertising placement is accordingly high. This system may be indexed for example to third party indicia such as the well-known Nielsen Ratings.

Another important source of revenue for operators is "on demand" programming. As previously noted, subscription on-demand (e.g., SVOD) effectively allows a subscriber unlimited access to on-demand programming for a monthly or annual flat fee. HDVOD in contrast may be used as a basis for additional incremental revenue; i.e., by charging a premium or one-time fee for access to HD programming on-demand.

Free on-demand video (FVOD) provides no direct incremental revenue, but may significantly enhance subscriber satisfaction ("value add"), and may also provide indirect revenue benefits (e.g., where a subscriber sees something in the FVOD content which causes them to either request additional content or services, purchase goods over the network, etc.)

Similarly, access to high-speed data capacity (e.g., DOCSIS cable modem, or via OD infrastructure as previously described) may be an additional incremental source of revenue; premier or higher paying subscribers can be allocated additional downstream and/or upstream bandwidth for their data services. This can be on a flat fee basis (e.g., additional bandwidth for an additional $X per month), on an actual use basis (e.g., $X per Mbps actually used), offered as an incentive to premium subscribers as part of a subscription package, or any number of other approaches.

A variety of different approaches to network optimization in light of revenue or profit considerations are known in the prior art. For example, U.S. Pat. No. 7,143,431 to Eager, et al, issued Nov. 28, 2006 entitled "Method for reduced bandwidth for on-demand data streaming using mini-clusters" discloses an improvement on dynamic skyscraper delivery of continuous media programs, such as video, divides the channels used for the delivery of the video into leading and trailing groups. A cluster defining on transmission of a program can then be broken into mini-clusters in the leading group which may be freely matched to full clusters in the lower group with loosened alignment requirements. This decoupling provides more efficient allocation of bandwidth to on-demand consumer requests and permits strategic opportunities to merge requests with concurrently allocated bandwidth for similar programs.

U.S. Pat. No. 7,075,945 to Arsenault, et al, issued Jul. 11, 2006 entitled "Dynamic mapping of broadcast resources" discloses a method wherein in a data communication system such as a high capacity DBS system, dynamic mapping of broadcast resources is provided to exploit occasional redundancy in the program content of two or more input data streams, freeing at least one broadcast resource to carry alternate bitstreams, such as additional programs or existing programs at higher quality. Transmission maps defining the correspondence between input data streams and broadcast resources, and reception maps defining the correspondence between broadcast resources and output data streams, are updated as needed to dynamically modify broadcast resource mapping to increase effective utilization of available bandwidth. Beneficial n:n-y:m mapping in a high capacity consumer DBS entertainment system is provided. Apparatus and methods for generating, maintaining and updating allocation maps with reduced overhead requirements, are disclosed.

U.S. Patent Application Publication No. 20020087976 to Kaplan, et al. published Jul. 4, 2002 entitled "System and method for distributing video with targeted advertising using switched communication networks" discloses a system and method for delivering broadcast-quality video with targeted advertising to viewers over the switched communication network. According to one embodiment, program streams with appropriately inserted splice points are transmitted from a network headend node to one or more egress nodes via a switched network. Because the switched network only carries program streams while advertising is inserted at the edges of the network, programs with demographically-targeted advertising can be delivered to many different subscribers without the need for using the bandwidth of the switched network to carry a unique program and advertising stream for each demographic group from the head end node.

One significant issue or disability with the foregoing methods relates to their lack of ability to combine or consider the total cost of network operation, along with the total revenue generated. The aforementioned prior art techniques perform optimization on one aspect of available network resources (i.e. bandwidth), or perhaps increase the marginal profit (e.g. targeted advertising), without taking into account the totality of considerations needed to optimize revenues for the network operator. This is particularly true of highly complex and diversified networks which may employ multiple distinct delivery channels and paradigms; e.g., VOD, broadcast switched delivery, DOCSIS data services, etc. Each of these different portions are traditionally operated in a substantially independent manner, and without consideration of revenue or profit implications for each portion individually or the network as a whole.

Moreover, many such prior art approaches are purely aimed at operational considerations such as peak bandwidth utilization efficiency, which may or may not be compatible with revenue or profit optimization. This is particularly true in a resource-constrained environment; certain subscriber requests may have significantly greater revenue or profit impact than others, and existing session or bandwidth allocation approaches do not take this fact into consideration when arbitrating between competing requests for limited resources.

Another significant issue with prior art approaches to network optimization (including the aforementioned VOD architectures) relates to the requirement for manual intervention or input on the part of the network operator (e.g., MSO) in order to make best use of the available bandwidth. Specifically, many such systems require periodic operator adjustment or input, which may also include the requirement for periodic evaluation of the subscriber's viewing or tuning habits, and the generation of adjustments to be inserted into the system control functions based thereon. One disability with this approach is the need for constant (or near-constant) operator vigilance. Another disability is latency; the operator is basically always lagging the problem since changes in subscriber habits can occur rapidly, and the efficacy of any corrections made by the operator will in large part depend on the timeliness with which the operator performs his/her analysis and corrective action/adjustment. Greater operator vigilance is also required when the system is approaching the limits of its capacity, since excursions in demand or changes in viewer habits can easily cause an over-demand condition (potentially resulting in a loss of service to one or more subscribers for a period of time).

Hence, based on the foregoing, there is a distinct need for improved apparatus and methods that permit resource allocation based on the optimization of costs and benefits to the network operator when fulfilling a program viewing or session requests made by subscribers, especially in resource-constrained (contentious) environment. Ideally, this process could be conducted on a request-by-request (i.e., per CPE) basis if desired, and effectively in real time. Such apparatus and methods would also ideally allow for the dynamic re-evaluation and reclamation of resources (e.g., VOD sessions).

Such improved apparatus and methods would also preferably work with a set of rules defined by a network operator, without undue manual intervention, or continuous vigilance by the network operator.

SUMMARY OF THE INVENTION

The present invention satisfies the foregoing needs by providing inter cilia methods and apparatus for optimizing the operation of a content-based network based on business considerations.

In a first aspect of the invention, a method of operating a content-based network is disclosed. In one embodiment, the network has a plurality of consumer premises equipment (CPE) associated therewith, and the method comprises: receiving a request for on-demand content delivery from a CPE of the network; evaluating at least two possible delivery options for servicing the request, the evaluating being performed based on at least one operational consideration and at least one profit or revenue consideration relating to the network; and based at least in part on the evaluating, performing one of the at least two possible delivery options in order to service the request.

In one variant, the at least two options comprise: (i) an HD version of the requested content; or (ii) an SD version of the requested content, and the at least one operational consideration comprises bandwidth.

In another variant, the evaluating is performed using a supervisory session resource management process of the network.

In a further variant, the evaluating based on at least the bandwidth and the revenue or profit consideration comprises performing a revenue analysis for each of the options, and selecting the option with the optimal revenue.

In still another variant, the evaluating based on at least one profit or revenue consideration comprises evaluating based on at least one demographic associated with a subscriber of the requesting CPE.

In a second embodiment, the method comprises: receiving a plurality of requests for content delivery from CPE of the network; evaluating at least a portion of the plurality of requests in terms of a cost and benefit associated therewith; and preferentially prioritizing at least one of the requests over others of the requests for resource allocation based at least in part on the evaluating.

In one variant, the network comprises an on-demand delivery infrastructure, and the evaluating is performed by a session resource management (SRM) software entity associated with the on-demand infrastructure. The plurality of requests comprise e.g., at least one request for each of: (i) free on-demand (FOD) content; (ii) subscription video on-demand (SVOD) content, and (iii) high definition video on-demand (HDVOD) content.

In another variant, the method further comprises allocating the resource from one of a plurality of different sources within the network, the sources being associated with different content delivery modes. The resource comprises for example bandwidth, and the different content delivery modes comprise on-demand and switched broadcast delivery modes.

In a further variant, the act of evaluating comprises evaluating at least one of the cost and the benefit against a predetermined threshold value.

In still another variant, the method further comprises: allocating the resource based at least in part on the act of evaluating; subsequent to the act of allocating, re-evaluating the cost and benefit for at least a portion of then-existing ones of the requests; and dynamically re-allocating the resource based at least in part on the re-evaluating.

In a second aspect of the invention, a method of operating a content based network comprising a first network portion and a second network portion is disclosed. In one embodiment, the method comprises: receiving a request to deliver first content to a first subset of subscribers of the network via at least the first portion; receiving a request to deliver second content to a second subset of the subscribers via at least the second portion; evaluating at least one revenue or profit consideration relating to the first and second content delivery requests; and selectively allocating bandwidth between the first and second portions of the network based at least in part on the act of evaluating.

In one variant, the first portion comprises an on-demand delivery network, and the second portion comprises a broadcast delivery network.

In another variant, the act of evaluating comprises prioritizing one of the requests over the other based at least in part on the revenue or profitability associated with servicing each of the requests.

In yet another variant, the act of selectively allocating comprises at least taking bandwidth that was otherwise allocated to the first portion, and allocating it to the second portion.

In a third aspect of the invention, a method of operating a content based network having a plurality of client devices associated therewith is disclosed. In one embodiment, the method comprises: receiving from at least a portion of the plurality of client devices a plurality of requests for delivery of a first content element; receiving from at least a portion of the plurality of client devices a plurality of requests for delivery of a second content element; evaluating the revenue or profitability associated with servicing at least one of the requests for the first and second content in either of a first format or a second format; and assembling at least one transport using the first content in one of the first or second formats, and the second content in one of the first or second formats, based at least in part on the evaluating.

The at least one transport comprises for example a multiplexed quadrature amplitude modulated (QAM) radio frequency carrier.

In one variant, the first format comprises a standard definition (SD) format, and the second format comprises a high definition (HD) format. The assembling based at least in part on the evaluating comprises e.g., assembling the at least one transport so as to maximize revenue or profitability.

In another variant, the method further comprises identifying at least one of the at least portion of the plurality of client devices comprises an SD upconversion capability.

In still a further variant, the method further comprises evaluating the at least one assembled transport for bandwidth efficiency.

In a fourth aspect of the invention, a server apparatus for use in an on-demand content delivery network is disclosed. In one embodiment, the apparatus comprises: a processor; a storage device in data communication with the processor; and a computer program disposed on the storage device and operative to run on the processor, the program comprising a plurality of instructions which when executed, selectively prioritizes session allocation among a plurality of requests associated with different service classes within the network.

In one variant, the different service classes comprise a first class delivering standard definition (SD) content, and a second class delivering high definition (HD) content.

In another variant, the different service classes comprise a first class having a first cost-benefit implication for the network, and a second class having a second cost-benefit implication for the network different than the first implication.

In still a further variant, the different service classes comprise a first class having a first quality-of-service (QoS) level, and a second class having a second QoS level different than the first level.

In yet another variant, the different service classes comprise a first on-demand class having a first cost-benefit model, a second on-demand class having a second cost-benefit model, and a third on-demand class having a third cost-benefit model. For example, the first on-demand class may comprise free video on-demand (FOD), the second class may comprise standard definition video on-demand (SVOD), and the third class may comprise high definition video on-demand (HDVOD).

In still another variant, the different service classes comprise a first class having a first maximum duration, and a second class having a second maximum duration different than the first duration.

In another embodiment, the server apparatus comprises: a processor; a storage device in data communication with the processor; and a computer program disposed on the storage device and operative to run on the processor, the program comprising a plurality of instructions which, when executed: receives a plurality of session requests; evaluates the requests in terms of at least one of financial benefit and network cost associated with servicing the requests; prioritizes at least a portion of the requests based at least in part on the evaluation; and allocates sessions on the network based at least in part on the prioritization.

In one variant, the at least one computer program comprises a session resource manager (SRM) process, and the server apparatus comprises a VOD server.

In another variant, the at least one computer program when executed further dynamically optimizes bandwidth efficiency by selectively assigning high definition (HD) and standard definition (SD) programs to a plurality of available QAMs within the network.

In a fifth aspect of the invention, a method of operating a content based network having a finite resource is disclosed. In one embodiment, the method comprises: operating the network according to a first resource allocation model when the resource is not constrained relative to existing requests for service; and operating the network according to a second resource allocation model when the resource is constrained relative to existing requests for service.

In one variant, the resource comprises downstream bandwidth, and at least the second model bases allocation of the bandwidth on at least the revenue or profitability associated with servicing different ones of the existing requests.

In another variant, the second resource allocation model comprises a plurality of different service classes, the service classes having a prescribed hierarchy of priority based on at least revenue or profitability.

In a sixth aspect of the invention, a method of doing business via a content-based network is disclosed. In one embodiment, the method comprises: providing a plurality of on-demand service classes, each of the classes having a different revenue implication for the network; and selectively allocating resources within the network to the service classes based at least in part on a business rule, the business rule evaluating the different revenue implications with respect to a desired business goal.

In one variant, the desired business goal comprises maximized revenue, and the selectively allocation of resources comprises selectively allocating bandwidth in a bandwidth-constrained environment.

In another variant, the selective allocation comprises dynamically evaluating a plurality of requests for delivery of services within the plurality of classes, and prioritizing the requests.

BRIEF DESCRIPTION OF THE DRAWINGS

FIG. 2 is a logical flow diagram illustrating one embodiment of the generalized methodology of revenue- or profit-based optimization according to the invention.

FIG. 4B illustrates the use of an exemplary GSRM session removal and management algorithm of the GSRM.

DETAILED DESCRIPTION OF THE INVENTION

Figure 1:
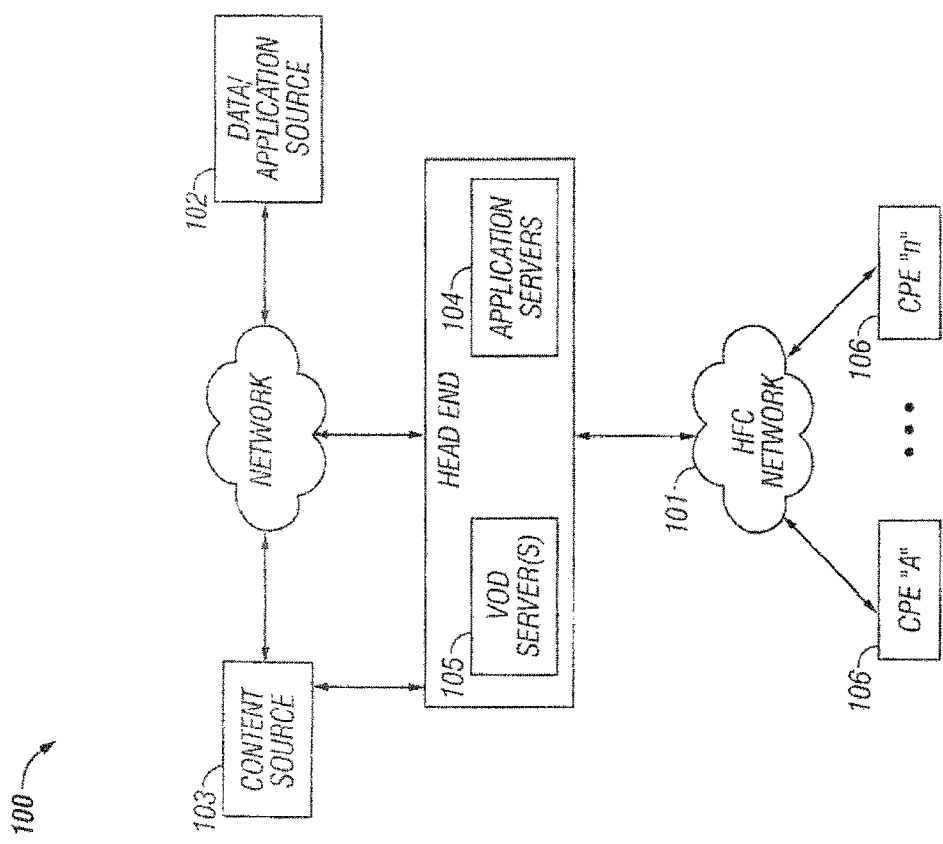
FIG. 1 is a functional block diagram illustrating an exemplary HFC cable network configuration useful with the present invention.

Reference is now made to the drawings wherein like numerals refer to like parts throughout.

As used herein, the term "advertisement" and similar forms refers without limitation to any audio, visual, or other promotion, message, or communication, whether for-profit or otherwise, that is perceptible by a human. Examples of advertisements include so-called "bumper" advertisements (advertisements inserted before or after a client requested program), "pause" advertisements (presented when a client sends a pause control command to a video server or the like), or additional and replacement advertisements.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multimedia specific operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internees, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "on-demand" or "OD" is meant to include any service that enables real, quasi-real time (e.g. "trick" mode delivery) or even non-real time delivery of content such as audio and/or video programs at any resolution, or data. Such content may be, for example, stored or temporarily cached on a server, or streamed directly from a source, and may be in response to a user-initiated event, service profile or configuration, head-end event, or otherwise.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "trickle download" refers to without limitation any delivery or download mode which is at a rate appreciably less than the maximum capability of the extant network over which the downloaded content is being delivered. For example, one type of trickle download might comprise a slow, substantially constant rate download "in the background" using small amounts of excess primary bandwidth capability. Trickle downloads may programmatic (e.g., predetermined to continue in one session until complete, such as based on a bandwidth reservation), or may also be opportunistic; e.g., conducted in two or more segments as excess capacity becomes available.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity.

As used herein, the term refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, nanowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for the "intelligent" optimization of content-based network operation based on, e.g., cost and/or revenue implications in the context of "on-demand" video services such as e.g., VOD, FOD, SVOD, and HDOD, as well as optionally from a more global perspective (e.g., on-demand, switched broadcast, and high-speed data/cable modem services considered as a whole). These methods and apparatus are particularly useful in a resource-constrained or contentious environment, such as where there is insufficient bandwidth to allocate to all pending requests.

When a consumer premises device attached to the network tunes to a particular broadcast program or requests an on-demand session, it uses at least some network resources, but also may create the potential for revenue gain to the network operator. For example, each program delivery will use additional bandwidth on the network, but may also expose more subscribers to a given advertisement or commerce opportunity, thereby creating more "impressions" on potential buyers of the goods or services of that advertisement. Therefore, efficient management of programming delivery in response to subscriber requests is critical to optimize the network operation such that e.g., benefits or profits are maximized, and burdens or costs are minimized. Prior art approaches to on-demand session allocation and network management as a whole generally have not considered these factors, focusing rather on purely operational considerations.

The present invention provides for the dynamic evaluation and reallocation of network assets based on inter alia the revenue and "cost" implications associated with various resource allocation options. For example, in one embodiment, a Global Session Resource Manager (GSRM) is utilized in order to assess the various implications of different possible resource allocations within the on-demand (OD) delivery paradigm; e.g., FOD, SVOD, HDVOD, and so forth. Each of these different OD models carries with it potentially different resource requirements as well as different revenue and profit implications. The GSRM can dynamically re-allocate program streams within the OD delivery portion of the network (such as according to one or more predetermined or dynamically variable criteria) in order to continually optimize the revenue/profit versus resource cost equation.

Moreover, these resource cost and revenue/profit implications may be altered when considering the network as a whole, such as for example in cases where resource contention between OD and broadcast switched delivery modes exists. In such cases, the GSRM may optionally incorporate information derived from other portions of the network, such as from a network operations controller (NOC) associated with the aforementioned broadcast switched portions, in order to evaluate the network wide cost/benefit ramifications of each option.

The aforementioned GSRM may allocate resources from a number of sources within the network. For example, in one embodiment, the resource being allocated comprises downstream bandwidth, and the GSRM can allocate bandwidth: (i) from downstream broadcast QAMs; (ii) from one or more VOD servers; or (iii) across different transports within the global network (e.g., from VOD to broadcast QAMs, or vice versa). Moreover, QAMs within the network (including those that might otherwise be allocated to DOCSIS use) may be treated as a resource "pool" for allocation by the GSRM.

In another embodiment, "packing" of SD and HD program streams is optionally employed by the GSRM to further achieve resource utilization and revenue/profit optimization. In one variant, the packing is based on revenue or profit, which may or may not correlate with conservation or most efficient use of bandwidth. In another variant, a most-loaded or least-loaded type approach is used to avoid stranding as much bandwidth as possible, with this projected "pack out" then being evaluated by the GSRM in terms of revenue and/or profit.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where profit/revenue optimization is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

Figure 1A:
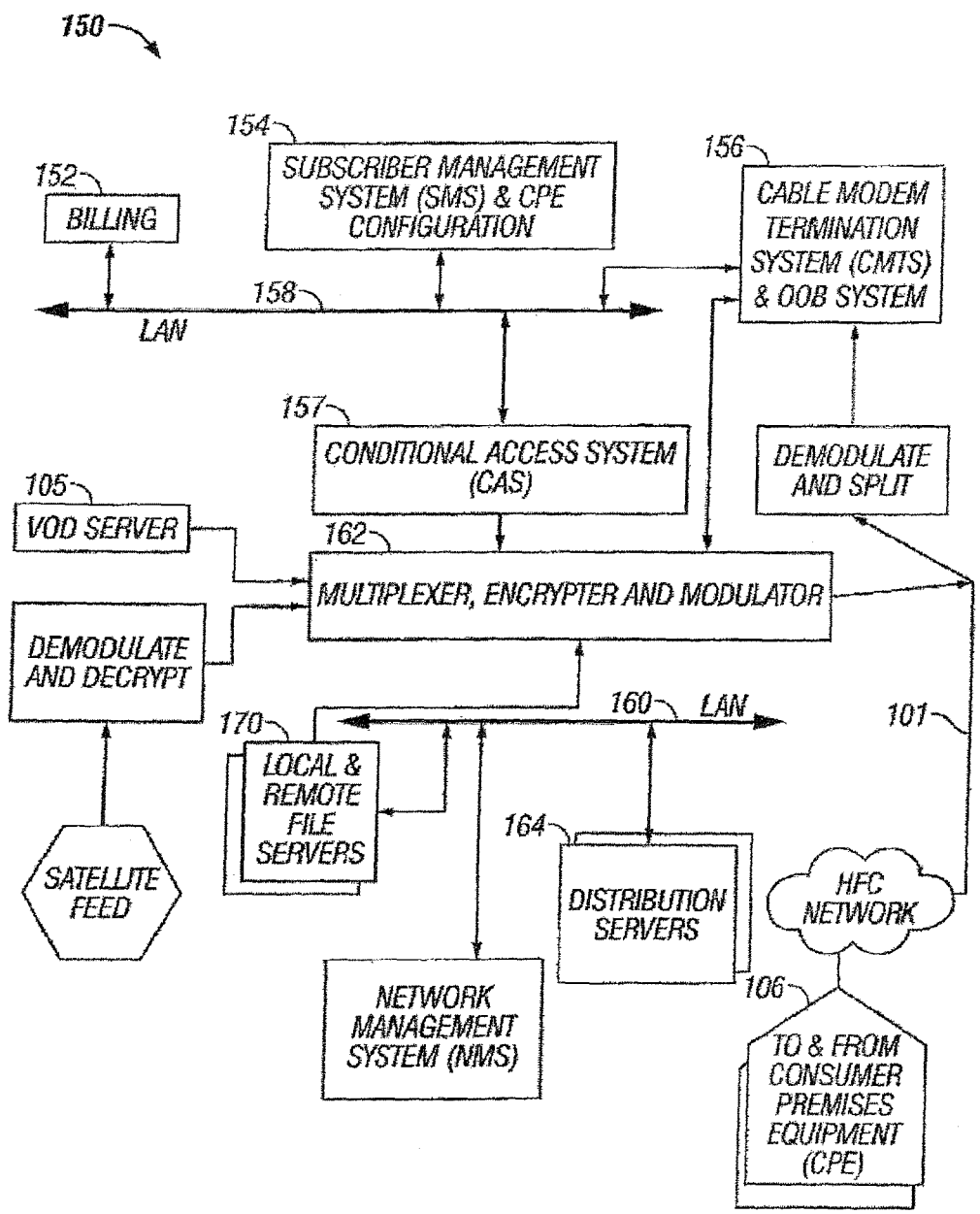
FIG. 1A is a functional block diagram illustrating one exemplary HFC cable network headend configuration useful with the present invention.

FIG. 1 illustrates a typical content-based network configuration with which the apparatus and methodology of the present invention may be used. The various components of the network 100 include (i) one or more data and application origination points 102; (ii) one or more application distribution servers 104; (iii) one or more VOD servers 105, and (iv) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1A for simplicity, although it will be recognized that comparable architectures with multiple origination points, distribution servers, VOD servers, and/or CPE devices (as well as different network topologies) may be utilized consistent with the invention. For example, the head-end architecture of FIG. 1B (described in greater detail below) may be used.

The application origination point 102 comprises any medium that allows an application (such as a VOD based application) to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 a computer system where on-demand content can be received from one or more data sources 102 and enter the network system. These servers may generate the content locally, or alternatively act as a gateway or intermediary from a distant source. The VOD server 105 includes the Session Resource Manager (SRM) functionality (and GSRM or Global SRM functionality described subsequently herein), and asks the Digital Network Control System (DNCS) for resources. The DNCS responds with negative or positive response to the request, and the VOD server implements the appropriate resource allocation logic.

The CPE 106 includes any equipment in the "customers' premises" (or other locations, whether local or remote to the distribution server 104) that can be accessed by a distribution server 104. Such CPEs 106 comprise processors and associated computer memory adapted to store and run the downloaded or resident application, as well as receive the streamed in-band content. In the present context, at least a portion of the VOD application is typically downloaded to the CPE 106, wherein the latter executes the downloaded application(s)/components, although it will be recognized that all of applications may conceivably be uploaded to the server, or alternatively transferred to another device, such as other networked CPE or the like.

Figure 1B:
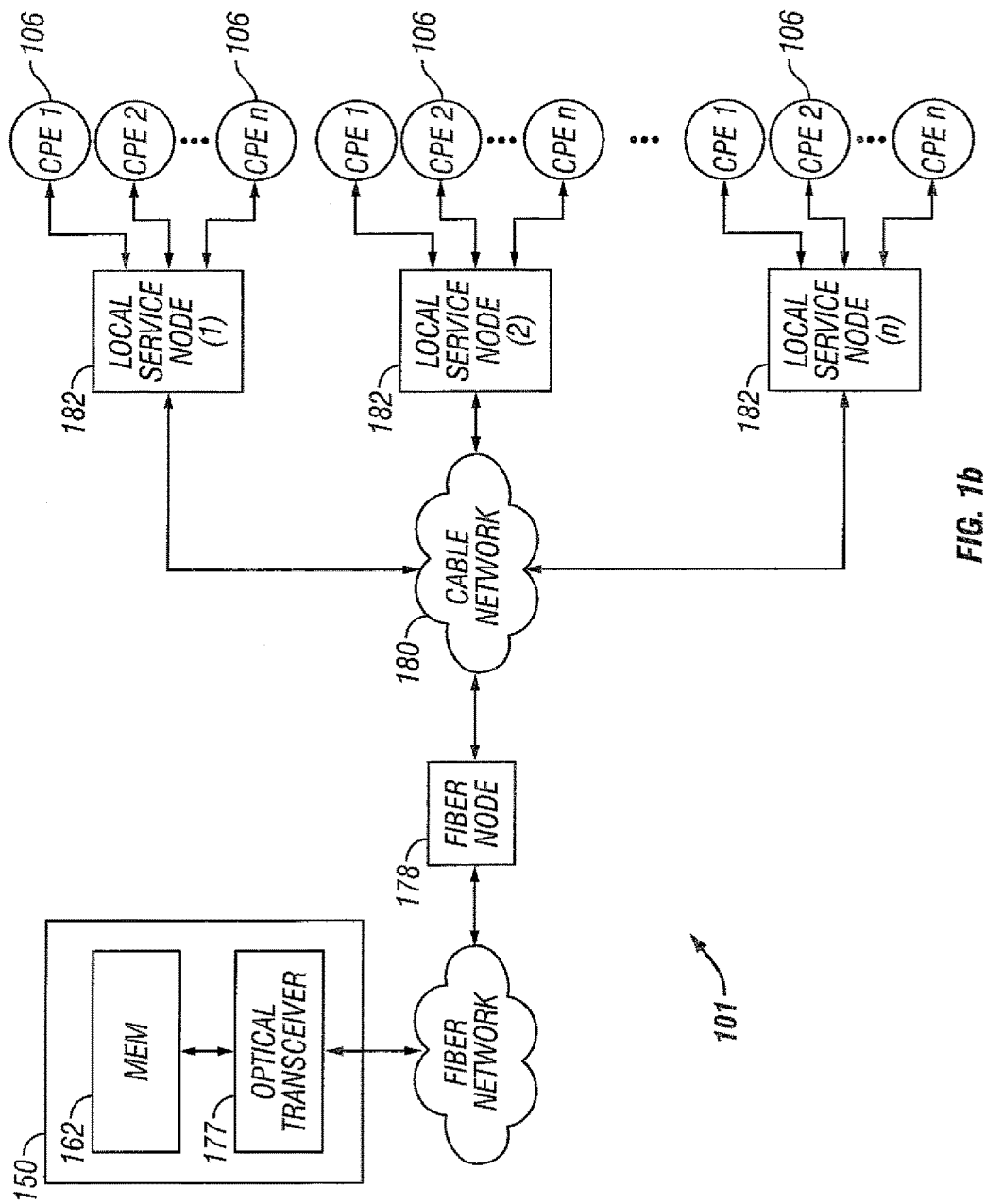
FIG. 1B is a functional block diagram illustrating one exemplary local service node configuration useful with the present invention.

Referring now to FIG. 1A, one exemplary embodiment of a head-end architecture useful with the present invention is described. As shown in FIG. 1A, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1B is high-level, conceptual architecture and that each MSO may have multiple head-ends deployed using custom architectures.

The architecture 150 of FIG. 1A further includes a multiplexer/encrypter/modulator (MEM) 162 coupled to the HFC network 101 adapted to "condition" content for transmission over the network. In the present context, the distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1B).

It will also be recognized, however, that the multiplexing operation(s) need not necessarily occur at the head-end 150 (e.g., in the aforementioned MEM 162). For example, in one variant, at least a portion of the multiplexing is conducted at a BSA switching node or hub. As yet another alternative, a multi-location or multi-stage approach can be used, such as that described in U.S. patent application Ser. No. 11/048,334, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, etc.) is provided in each downstream (in-band) channel associated with the relevant service group. To communicate with the head-end, the CPE 106 uses the out-of-band (OOB) or DOCSIS channels and associated protocols. The OCAP specification provides for networking protocols both downstream and upstream.

In another embodiment, the network infrastructure includes one or more on-demand file or "carousel" functions. Specifically, the present invention contemplates that not only will more traditional movie (e.g., MPEG) data be delivered, but also data including, e.g., for interactive applications or other types of applications. For example, in a fashion not unlike existing approaches to ordering an on-demand (OD) movie, an application could request data, images, links, audio files, video files, and the like in an on-demand fashion. These unique data types may comprise single files, or be combined into a single or multiple data carousels, with each carousel potentially having a different data rate.

It will also be recognized that the multiple servers (VOD or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. One exemplary multi-server architecture particularly useful with the present invention is described in co-pending and co-owned United States Patent Application Publication No. 20020059619 to Lebar published May 16, 2002 and entitled "Hybrid central/distributed VOD system with tiered content structure" which is incorporated herein by reference in its entirety.

Specifically, a hybrid central/distributed and tiered video on demand (VOD) service network with tiered content structure is disclosed. In particular, the system uses media servers located in both the head-end and hub stations. Set-top boxes generally would be supplied VOD services from the high-demand content media servers located in the hub station nearest to the user. The central media server located in the head-end would be used as an installed backup to the hub media servers; as the primary source for lower demand VOD services and as the source of the real time, centrally encoded programs with PVR (personal video recorder) capabilities. By distributing the servers to the hub stations, the size of the fiber transport network associated with delivering VOD services from the central head-end media server is reduced. Hence, each user has access to several server ports located on at least two servers. Multiple paths and channels are available for content and data distribution to each user, assuring high system reliability and enhanced asset availability, Substantial cost benefits are derived from the reduced need for a large content distribution network and the reduced storage capacity requirements for hub servers.

Many other permutations of the foregoing system components and communication methods may also be used consistent with the present invention, as will be recognized by those of ordinary skill in the field.

Network Cost and Revenue Implications—

The present invention presents a new paradigm for, inter alia, evaluating and allocating sessions within a VOD network. Whereas prior art approaches focus solely on operational considerations such as most efficient bandwidth utilization (i.e., squeezing as much bandwidth out of a given installed infrastructure as possible), exemplary embodiments of the present invention focus on the cost and benefits (including revenue and profit) to the network and network operator as part of the session allocation decision, especially in the context of a resource-limited environment.

These two goals (operational efficiency and maximizing revenue or profit) may not always yield the same result. For example, the most efficient packing of a plurality of QAMs from a bandwidth utilization perspective might comprise packing the QAMs with all SD programming. However, under a given revenue model, the MSO may be able to derive significant additional revenue from delivering programs in HD (e.g., such as an extra fee for each HD program delivered, etc.). If the equivalent SD programming provides no additional revenue, such as if it is delivered as part of an existing subscription at no extra revenue to the MSO, replacement of the SD programming with HD equivalents may actually yield more revenue, albeit making less efficient utilization of the available bandwidth.

In terms of consumption of network resources, the "cost" of fulfilling a given session request may include the additional bandwidth required to service the request. A different bandwidth cost may be associated with each segment of the network. For example, when a CPE requests a VOD program located at a headend server (such as a VOD server 105), the cost associated with setting up the session and resulting content flow includes the cost of adding bandwidth between the headend and any intermediate hubs in the delivery path, as well as another component of cost associated with allocating bandwidth on the coaxial part of the network from an edge CLAM device to the requesting subscriber's CPE 106 (e.g., CPE connected to the same hub may be able to share a program in the core network and on the connection from hub to premises, but CPE on different hubs may only be able to share a program at the core of the network, yet not downstream from the hub).

Additional "costs" to the network may also include the resources required to obtain or capture content from sources such as third party studios or content providers, national feeds, etc. (including for example real time acquisition costs or Rats), as well as any processing or overhead associated with storing, generating, formatting and providing the requested content downstream in a useable format.

So-called "opportunity costs" may also exist and need to be considered in the evaluation of costs to the network for given delivery options. For example, if one option presents the MSO with an "either/or, but not both" situation, selecting one option over another may involve the loss, or possibility of loss, of revenue or other benefits to the network that might otherwise have been received. As an illustration of this principle, consider the case where bandwidth is constrained, and no new VOD sessions can be created if a new BSA stream is instantiated (or vice versa); there is necessarily an opportunity cost for the loss of the VOD session (or BSA stream) that could have otherwise been created.

In some cases, the impact of additional CPE requests for content may comprise no additional burden to the network operator's available resources, such as where a BSA program stream already exists. However, due to the nature of on-demand content delivery including so-called "trick mode" functions such as PVR, session requests must be treated as unique, and instantiated separately.

It will be appreciated that in the context of the present invention, the impact of "costs" accrued by the network during operation can to some degree be mitigated through the use of timely clean-up or reclamation processes. Such processes are well known in the art, and typically computer programs or processes that are used to recover assets for other uses when they are no longer required by the prior use. For example, one such reclamation function comprises the timely termination of a VOD session after completion, which frees up bandwidth for other sessions or uses. Hence, by ensuring that such reclamation processes are employed effectively and aggressively, the MSO can avoid situations where costs associated with particular courses of action are open-ended; i.e., the costs can be terminated promptly when there is no longer a need for the service associated with the cost.

In terms of derived benefit, any number of different revenue or profit implications may result from the creation of a new session (or the termination or migration of an existing session). For example, the addition of a first type of VOD session (e.g., HDVOD) might carry a first incremental benefit, a second type of VOD session (e.g., SVOD) a second, different benefit, and so forth.

Additionally, various service tiers or configurations may exists in a network, and users may be paying different subscription rate or per-program subscription fees depending on e.g., the variety of different ways to deliver the program including VOD, real time or trickle-in, high definition (HD) or standard-definition (SD), commercial free or not, PVR/DVR capability, and so forth. Accordingly, classes or categories of subscribers exist within the network, and the information regarding the originating CPE (and the associated subscriber)

The creation of a revenue opportunity may be illustrated in the following simple example. When a subscriber requests to initiate a VOD session, the GSRM may offer the subscriber a choice between an HD version of the program and an SD version. The latter option may utilize less bandwidth and therefore allowing for more content delivery to other subscribers, yet the HD version may increase the requesting subscriber's satisfaction and ultimately desires to initiate more VOD requests, or even maintain their subscription for a longer period of time. The selection of the HD version may also optionally require the subscriber to pay an additional fee, thereby producing a direct and tangible revenue for the MSO. However, as previously noted, the HD session will consume about 4 times the bandwidth of the SD version (thereby invoking opportunity cost to the MSO), and additional network costs might exist such as overhead associated with recoding and storing the content in the HD format, etc.

Similarly, the MSO might decide to trade an HD program stream that has been requested for use of the bandwidth for other purposes, and deliver an SD version of the requested program stream (or a "near-HD" upconverted version; see, U.S. patent application Ser. No. 11/881,034 entitled "METHODS AND APPARATUS FOR FORMAT SELECTION FOR NETWORK OPTIMIZATION" filed Jul. 24, 2007, 2007, incorporated herein by reference in its entirety, for exemplary methods and apparatus for determining capability for and delivering near-HD via upconversion technology).

Methods—

Referring now to FIG. 2, one embodiment of the generalized method of resource allocation in a content-based network is disclosed. It will be appreciated that while the following discussion is cast primarily in terms of an on-demand (OD) delivery paradigm, the general principles may be extended to other types of delivery modes, and in fact other types of networks.

As shown in FIG. 2, the first step 202 of the method 200 comprises receiving a plurality of requests from network subscribers for content delivery. For instance, in the present context, these requests might comprise a plurality of OD session requests. These requests may be received contemporaneously, or in a staggered fashion (yet which request content that overlaps its delivery with other earlier or later requests for at least some period of time). The content requested in each request may be the same or different, and may have the same or different duration, encoding/bitrate, etc. As previously noted, each session request is treated as being effectively unique.

Per step 204, the various requests under consideration at any given time are evaluated or identified as belong to one of a plurality of different service classes. For example, one request might comprise an on-demand session request for a standard definition (SD) program stream, whereas another request might comprise an on-demand session request for an HD stream for the same or different program. Two service "classes" might then exist or be created (i.e., SD and HD), and the various requests received categorized accordingly.

Similarly, various modes of on-demand content delivery can be used as the basis for classification; e.g., HDVOD might have the highest incremental benefit-to-cost implication or ratio, SVOD the next highest, FVOD the next highest, and so forth.

Per step 206, a business "rule" is applied in servicing the various classes of request identified in step 204. For example, one such rule might be to always service pending HD requests before SD requests, since such HD requests might as a class generate more revenue for the operator than contemporaneous SD requests (even when considering the additional bandwidth required to service the HD requests and associated opportunity and other costs, as previously described). This rule might also be completely inverted however; for example, in geographic regions or service groups where usage of HD programming is historically low, the provision of SD programming may have a higher revenue/profit correlation, thereby indicating that the SD programming should be delivered preferentially.

Figure 2A:
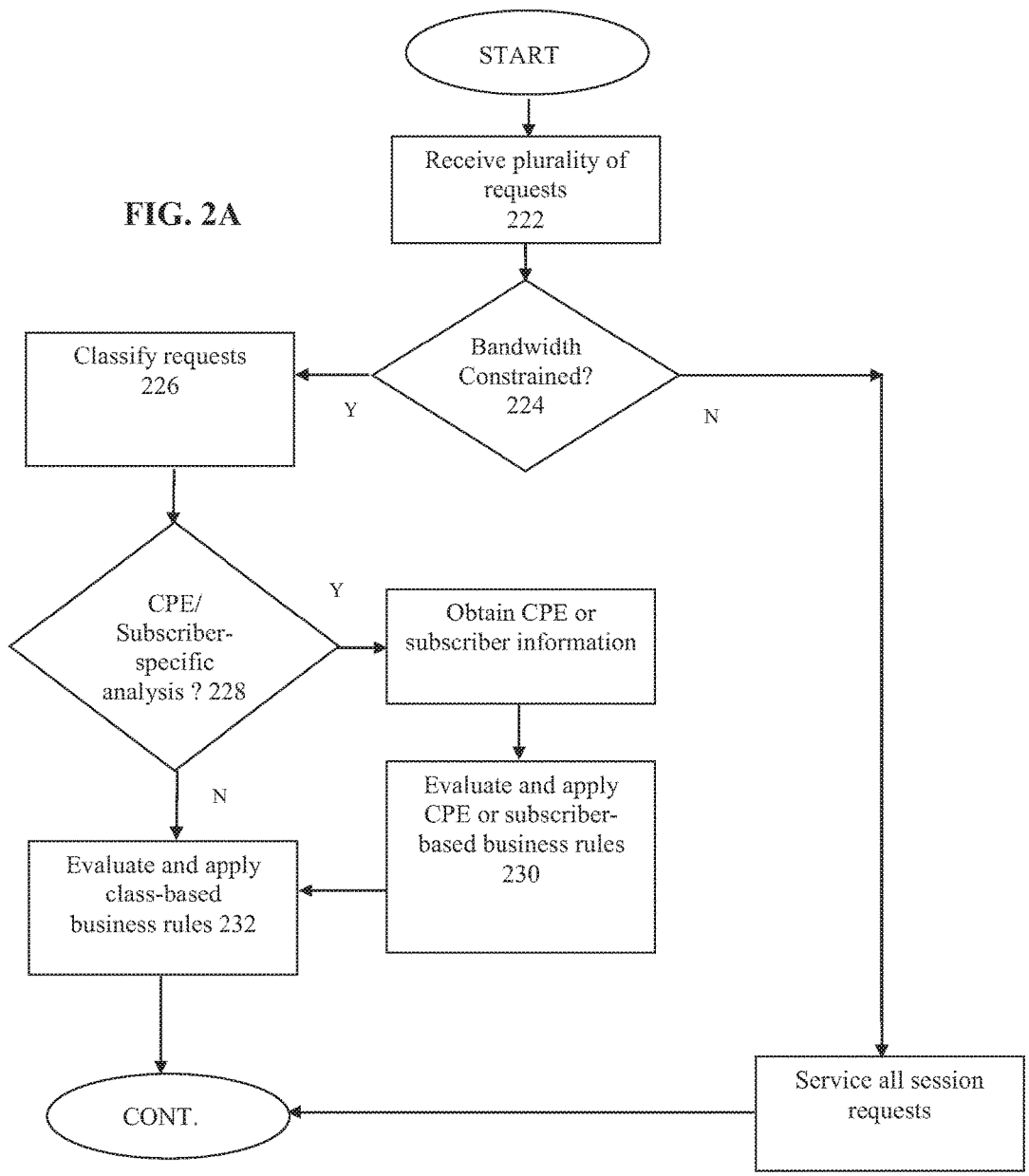
FIG. 2A is a logical flow diagram illustrating one exemplary implementation of the generalized methodology of FIG. 2.

FIG. 2*a* illustrates one exemplary implementation of the method of FIG. 2, specifically within a resource-constrained (e.g., bandwidth limited) environment. As shown in FIG. 2*a*, the first step 222 of the method comprises a receiving a plurality of requests for content delivery as in step 202 of the method of FIG. 2. These requests may be substantially simultaneous, or distributed over a period of time. Next, the requests are evaluated per step 224 to determine if they can all be serviced with existing or projected available bandwidth. If not (i.e., resource contention exists), then the requests are classified/categorized according to one or more classification schemes as previously described (step 226). This classification may also include optionally identifying one or more subscribers or subscriber demographics associated with each request per step 228. For example, whereas the methodology of FIG. 2 classifies requests based on type (e.g., SD or HD content requested, or HDVOD/SVOD/FVOD delivery), the methodology of FIG. 2*a* may seek to determine which specific subscriber made the request, and/or demographic to which the requesting subscriber belongs, so as to allow a more granular evaluation according to the business rules; e.g., whether the requesting subscriber belongs to a particular service tier (e.g., premium subscriber or the like). This level of granularity can be accomplished for example using a CPE identifier, or anonymously according to the hashed TUNER ID, TUNER USE or MAC ID variables set forth in co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety. Myriad other useful approaches for identifying a given subscriber or their CPE associated with a content request will be recognized by those of ordinary skill.

Per steps 230 and 232 as applicable, the various requests (or classes of requests) are evaluated in terms of one or more specified business rules. For example, a revenue metric may be associated with each type or class of request, so that the classes can be compared in that regard (e.g., HDVOD is always serviced before SVOD, which is always serviced before FVOD in a resource constrained environment). More complexity can be added or other parameters substituted, such as where the various network "costs" are also considered (here, the term "cost" referring generally to the allocation of resources or network infrastructure required to service the request, which may be reflected in monetary terms, network parametric terms, or otherwise, as previously described). Hence, in one example, an HD request from a "premier" subscriber might trump an SD session request from a basic level subscriber when bandwidth is constrained, based purely on the fact that the premier subscriber generates more revenue for the MSO, or there is an incremental payment made by the premier subscriber to receive the HD content, even when considering the fact that the HD session consumes four times the bandwidth of the SD session (cost).

Conversely, if there is no incremental revenue gain associated with the HD session request (e.g., it originates from a basic subscriber and no additional payment is necessary), the business rules might opt to deliver the requested session in SD (versus HD), and use the remaining 11.25 Mbps (3 additional SD sessions) to service three other SD requests, thereby ostensibly satisfying the greatest number of requests of equal revenue/cost stature.

It will also be appreciated that service requests (e.g., VOD session requests) can further be evaluated from a temporal standpoint. This can be thought of as a cost of sorts; i.e., how long the required resources will be tied up in servicing that request, versus what benefit may be derived. For instance, an HDVOD request might trigger a payment of a premium by a subscriber, but may also consume 15 Mbps of bandwidth (maximum) for 2.5 hours or more. Conversely, a contemporaneous SD FVOD request might produce no direct incremental revenue, but may only consume 3.75 Mbps maximum for 15 minutes. If the remaining 11.25 Mbps for 0.25 hours plus 15 Mbps for 2.25 hours can be used more productively from a revenue or profit standpoint, the business rule should service the FVOD request.

It will be appreciated that the foregoing methodologies may be applied to groups of requests or network users that vary in size (e.g., from two requests all the way up to a network-wide basis) if desired, and also may be applied in an iterative or sequential fashion, such as where the request associated with a first user is resolved at least in part before a request from a second user is processed, the outcome of the processing of the first user request being used as an input to the decision-making process of the second user request. Myriad other combinations and permutations of the foregoing will be appreciated by those of ordinary skill given the present disclosure.

Figure 2B:
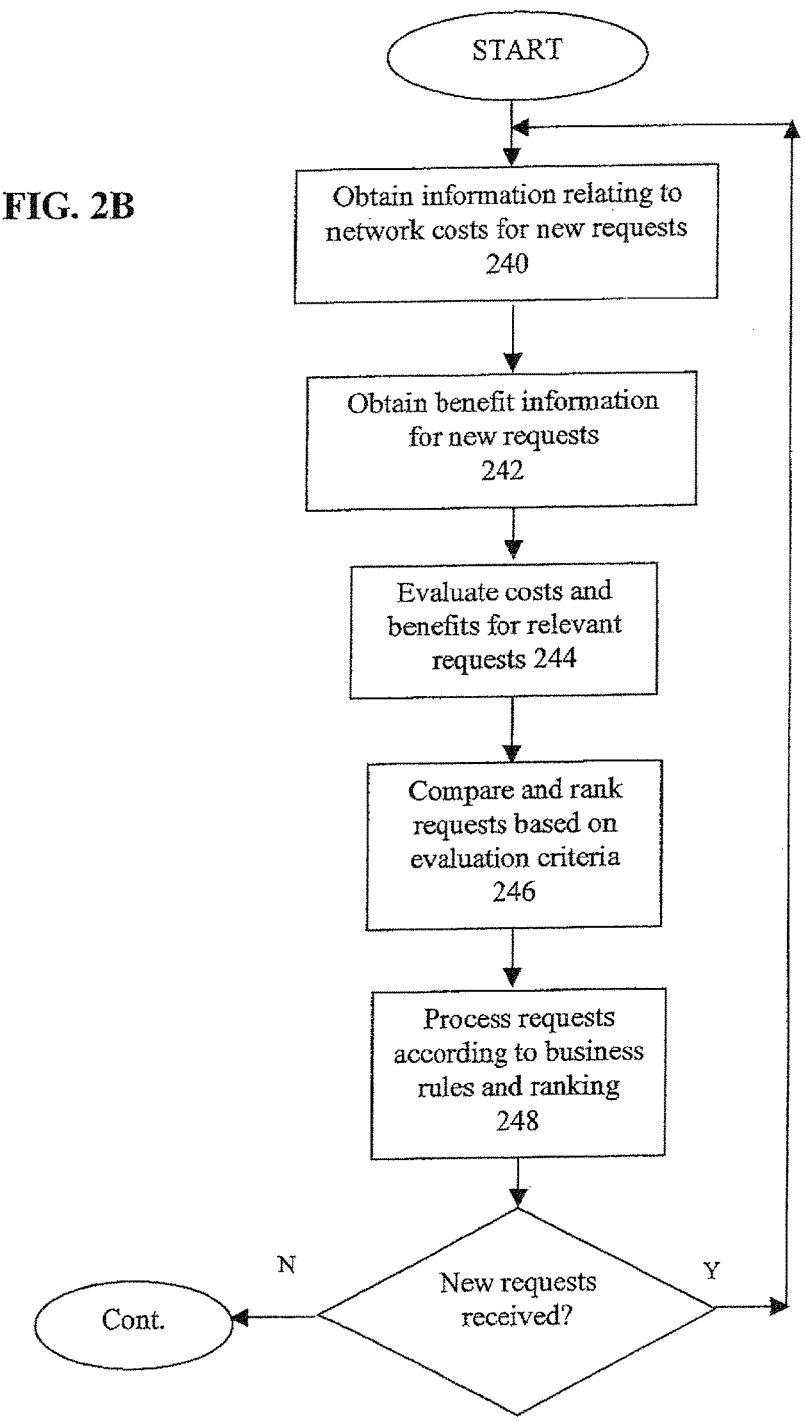
FIG. 2B is a logical flow diagram illustrating one exemplary implementation of the cost/benefit analysis of the method of FIG. 2A.

FIG. 2b illustrates one exemplary method for evaluating requests based on business rules (e.g., steps 230 and 232 in the method of FIG. 2a).

First, per step 240, information relating to network "costs" associated with various options for servicing content requests is gathered. This information may be pre-stored, such as via a cost record or "template" for certain types of transactions. For instance, it may be known that an SD VOD session request costs 3.75 Mbps for a period of time, uses a certain amount of processing and storage overhead, has a certain content acquisition cost, and also results in an opportunity cost estimated at $Y in lost advertising revenue that otherwise might have been delivered were the bandwidth dedicated to a broadcast stream carrying targeted advertising. This template may also be in the form of an algorithm that obtains a plurality of inputs regarding then-prevailing conditions (e.g., whether bandwidth is constrained, what time of day is it, what is the duration of the requested content, what geographic region does the request originate from, what service level or class is the requesting subscriber in, and so forth), and uses this information to generate one or more relative or absolute cost metrics. These metrics may be for example mathematical in nature (e.g., cost of 1 to 10), placed on a percentage basis, placed in terms of currency (e.g., $Q), etc. They may also be fuzzy or non-linear in nature, such as where a given cost is rated as "high", "medium", "low", or "none". They may also be made human-readable, such that a human operator can optionally view and use the information if desired. Any number of different schemes for placing cost information in a useful format will be recognized by those of ordinary skill.

Per step 242, information relating to network "benefits" for servicing the content request is gathered. Similar to the cost acquisition described above, these benefits may be stored in a template or profile record for the requested transaction, or generated on the fly via e.g., an algorithm. Benefits might include for example direct incremental revenue (e.g., the subscriber is charged or pays $Z for the transaction, the content includes promotional or advertising content thereby giving the advertiser a high probability of an impression, which translates to additional revenue for the MSO, when the latter uses an advertising rate structure based on the number and quality of such impressions), indirect and more intangible benefits such as subscriber satisfaction and loyalty, etc. As with costs, the benefits may by quantified in any numerical or other logical framework or form that makes them useful for further processing or analysis.

Once the information regarding costs and benefits has been obtained per steps 240 and 242, this information is evaluated per step 244 in order to identify specific cost-benefit tradeoffs or relationships associated with various options for servicing the outstanding requests. This may include for example the generation of a cost/benefit metric, such as a simple ratio or summation. For instance, in one variant, the component costs are given a relative value (e.g., 1 to 10) based on their significance to the network, and summed; similar operations are performed on the benefits. These two numbers are then subtracted to arrive at a net value (either positive indicating e.g., a net benefit, or negative indicating a net cost). In another variant, the sums are ratioed. It will be appreciated that more complex mathematical or logical analysis may also be performed if desired, such as weighting, use of statistical models, and so forth, the foregoing examples being merely illustrative.

The derived cost/benefit metrics are then compared directly to one another in the illustrated embodiment (step 246), so as to rank them according to score. The scored requests are then processed according to one or more rules per step 248. For example, in one variant, the then-pending requests are ordered in a service queue based on score, and allocated sessions in that order. In another variant, all requests within a class (e.g., HD requests, requests from premier tier subscribers, etc.) are ranked and then processed, and only when these requests have been exhausted will the ranked requests from a lower-priority class (e.g., SD requests) be serviced with remaining resources.

This process may also be performed iteratively or periodically, such as where the aforementioned scoring and ordering is reperformed each time a new session request is received. This approach keeps the queue ordering timely and up-to-date so that very recently received high-priority requests are not ignored for any extended period of time.

It will also be appreciated that the foregoing ranking process can be applied on a per-class basis. For example, in the context of the prior example of SD versus HD session requests, the SD requests pending at a given time may be aggregated into one class, and the HD requests into another class, and the cost/benefit analysis performed on the class as a whole. Conversely, the individual requests within a class can be evaluated and ranked or queued according to their individual cost/benefit scores or attributes. Other permutations of these approaches will be recognized as well given the present disclosure.

The invention may also be utilized in conjunction with one or more thresholds, such as where for example a certain number of FVOD sessions or a certain amount of bandwidth is allocated to FVOD sessions before subsequent session requests are curtailed; so long as the number/total bandwidth for FVOD sessions stays below the threshold, no allocation restrictions are applied. Each of the different classes of service may also have differing thresholds based on, inter alia, revenue and cost implications of each. The GSRM may also be configured to dynamically adjust such thresholds based on prevailing operational conditions and business/revenue/cost.

The methodologies of the invention may also be applied retroactively if desired. For example, one variant of the invention comprises selectively evaluating sessions that have already been granted for possible modification or even termination in extreme circumstances. This might be the case where resources are tightly constrained, and a comparatively high-revenue session request is received after the resources have already been allocated to lower priority (revenue) session requests. The new request is evaluated as previously described herein for cost and/or benefit implications, and compared to the existing sessions. One or more of the lowest priority sessions may be modified or even reclaimed at that point in favor of instantiating a new session for the high-priority request(s). For instance, an existing HD session might be replaced with an SD or SD-upconverted session so as to maintain service continuity to the lower-revenue subscriber, and the additional bandwidth used to service one or more higher-revenue SD sessions. In extreme situations, one or more existing can be completely terminated, such as where the MSO receives information from the relevant CPE or other indicia that the stream is not being viewed or productively utilized.

Network Software Architecture and Session Setup—

Figure 3:
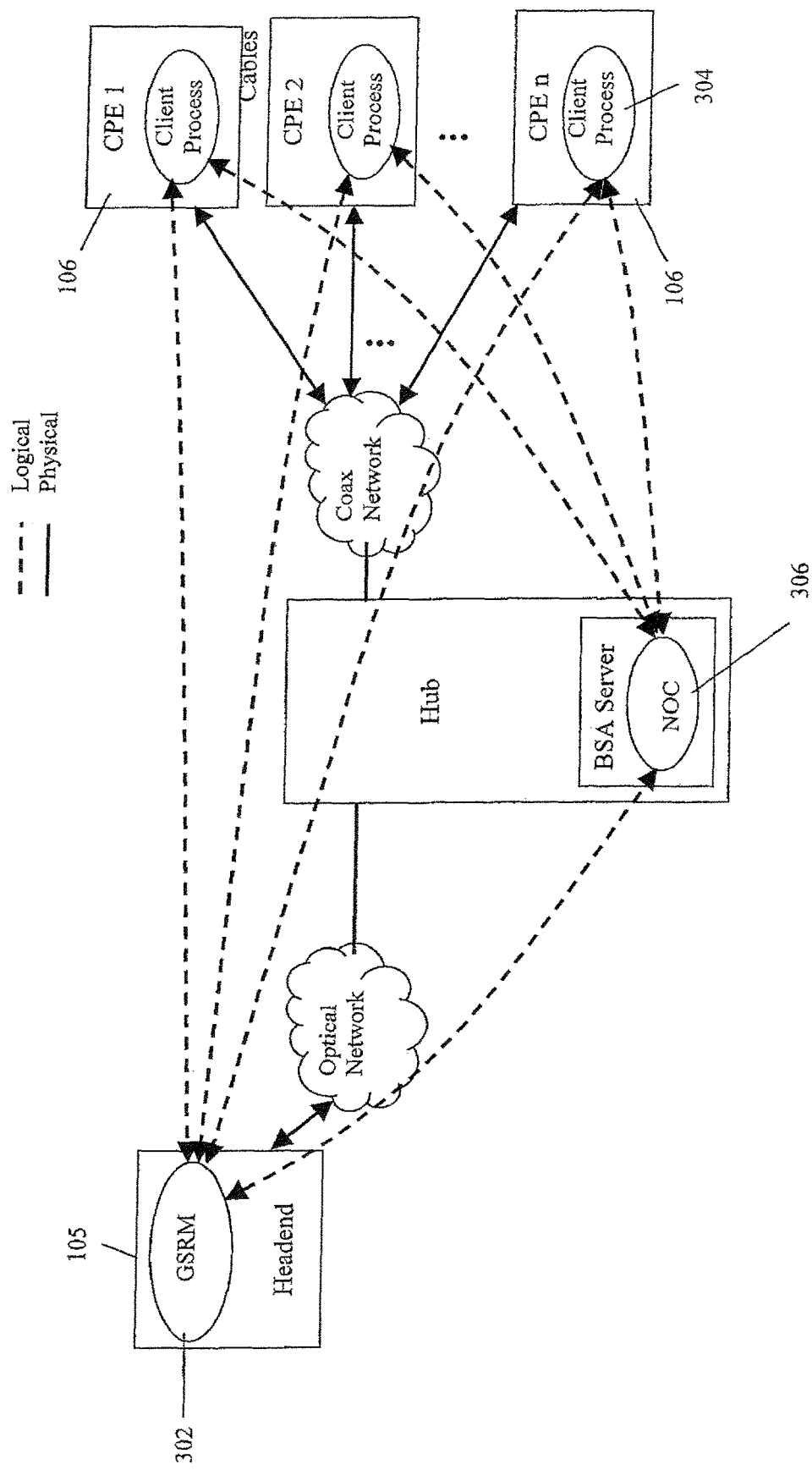
FIG. 3 is a functional block diagram illustrating one exemplary implementation of the generalized network software architecture according to the invention.

Referring now to FIG. 3, one exemplary embodiment of the network software architecture useful with the present invention is described. As shown in FIG. 3, the architecture 300 comprises a global session resource manager (GSRM) 302 which is in operative communication with or running on a VOD server 105 or other network entity. This server may be deployed at the headend 150, or even further away from the core of the network out to its edge (such as at a local service hub). Moreover, while shown as a single process, it will be recognized that the GSRM may be implemented as a plurality of related processes, such as in the form of a distributed application (DA) of the type well known in the software arts.

The GSRM 302 may also optionally communicate with one or more client applications 304 operative to run on the CPE 106, the latter communicating session requests and potentially other information to the GSRM via one or more upstream communication channels.

Since it is advantageous to introduce a new functionality into a cable network without having to add new software interfaces or hardware elements to the existing set up, the following exemplary embodiment of the invention uses session and stream creation methodologies which are completely analogous to a standard VOD flow, thereby obviating any such software and hardware additions. It will be appreciated, however, that such analogous methods are not required to practice the invention; hence, the following discussion is merely illustrative of the broader principles.

Figure 3A:
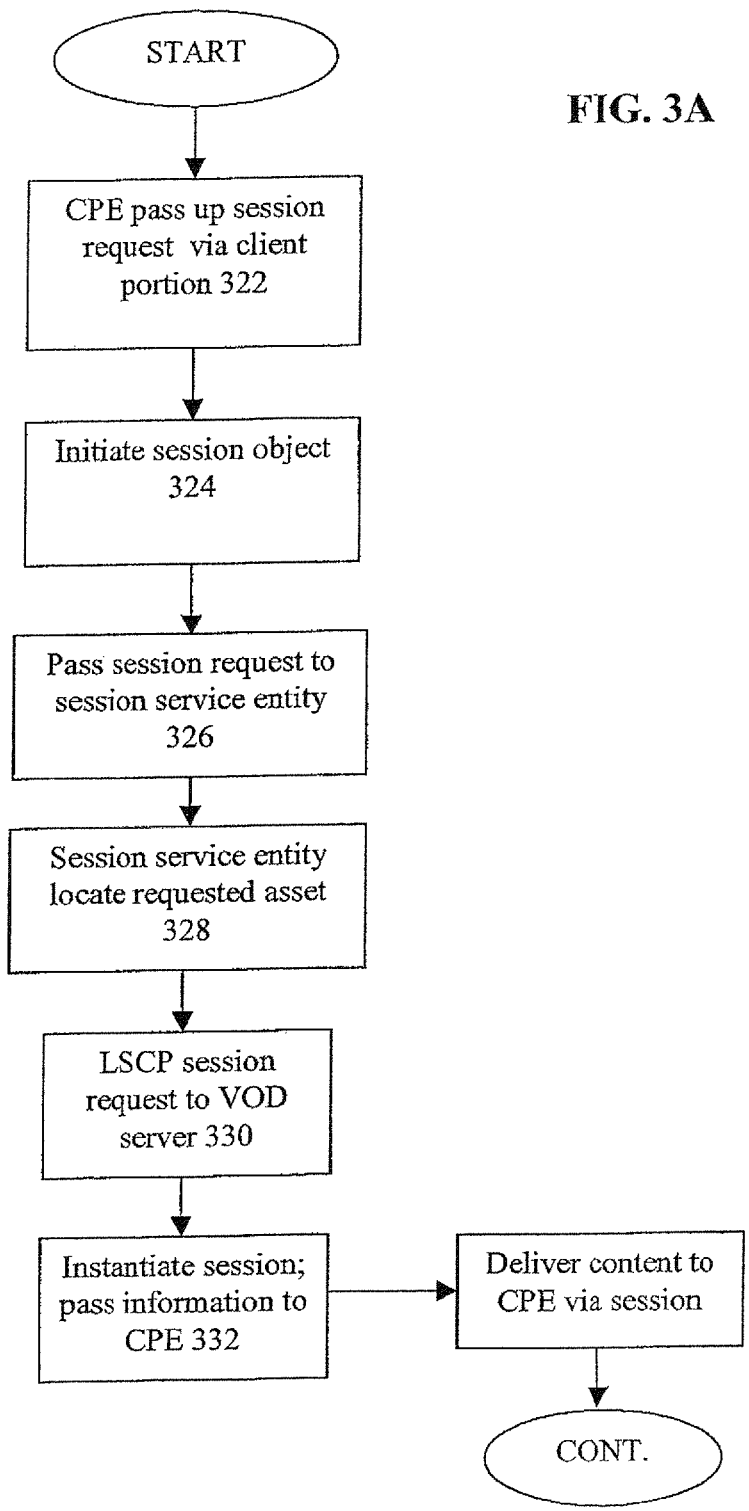
FIG. 3A is a logical flow diagram illustrating one exemplary embodiment of the method of session creation by the GSRM according to the invention.

As shown in FIG. 3A, the first step of the session creation process comprises the relevant client application 304 (e.g., navigation application, Watch TV, etc.) on the CPE 106 creating a session request which is passed up to the GSRM 302 using, e.g., the Session Setup Protocol (SSP) per step 322. A catalog entry is optionally created for the content; this action is performed so that user CPE 106 can be made aware of the availability of the content. This can be accomplished via, e.g., a navigator application implemented on the CPE 106, or some other user interface (UI) mechanism including on-screen alerts, audible signals, periodic or regularly scheduled status functions, etc.

The GSRM initiates a session by creating a Session object (step 324), and passes the Session object to a service entity (step 326). The service entity locates the relevant asset per step 328.

The Lightweight Stream Control Protocol (LSCP) is then used per step 330 to create the requested stream. As is well known, the LSCP allows, inter alia, VOD client sessions to communicate directly with a VOD server to control the content as well as streaming trick modes. However, it will be recognized that other protocols providing the desired functionality may be used consistent with the present invention.

Lastly, in step 332, the session information is transmitted back to the initiating CPE 106 via, e.g., an in-band or OOB downstream channel (or other communications channel). The content may also be processed into a format or protocol suitable for transmission over the cable network. For example, the data maybe formatted according to the well-known MPEG (e.g., MPEG2) packet data format for inclusion in an MPEG multiplexed transport. The content may also be encrypted or otherwise processed in any manner necessary to support delivery to the requesting CPE.

As shown in FIG. 3, the exemplary software architecture may also comprise a network operations controller (NOC) 306 of the type described in co-owned and co-pending U.S. patent application Ser. No. 11/974,700, entitled "METHODS AND APPARATUS FOR REVENUE-OPTIMIZED DELIVERY OF CONTENT IN A NETWORK" previously incorporated herein, or other such process which provides the GSRM 302 with information regarding other portions of the global network such as those tasked with delivery of broadcast switched streams. As previously noted, the different portions of the network (VOD, broadcast switched, DOCSIS, etc.) are under the prior art typically operated as separate entities, with operational decisions being made without necessarily considering the revenue or operational implications for other portions of the network.

The exemplary NOC of the illustrated embodiment comprises a logical supervisory entity (e.g., unitary or distributed software process) that implements cost/revenue optimization functions or rules as part of fulfilling program viewing requests. In various embodiments, the NOC may be implemented at a central location for the entire network (such as e.g., a regional or national level service center), one or more headends, or alternatively in a more locally distributed manner, such as on existing network components.

In one exemplary embodiment, the NOC is deployed to cost/revenue-optimize a subset of the network herein referred to a "zone." In the zone for which the NOC is responsible, the network operator programs the NOC with the topology of that zone, locations of program sources within the network, a cost and/or revenue profile of each CPE 106 within the zone, and/or other operational parameters such as for example total network bandwidth available (and perhaps the allocation of such bandwidth between DOCSIS channels and 6-MHz digital television channels).

Additionally, the foregoing disclosure also provides a mechanism for the consolidation or recombination of subscriber devices in the case of a resource-constrained (e.g., bandwidth contentious) environment. This mechanism allows for the intelligent migration of subscribers to a fewer number of less-pointedly targeted streams (yet that still bear a maximal correlation with their demographics/psychographics), thereby reducing the bandwidth consumption on the network.

The NOC utilizes a set of MSO rules in order to implement the foregoing cost/revenue optimization on a dynamic (and very granular) basis. While the exemplary implementation of the NOC is substantially automated, parameters associated with these rules can also be manually controlled if desired, so as to provide for the ability of operator control or override based on existing network circumstances. For example, one rule may provide different weights to benefit/burdens during the prime time compared to early morning hours. Another such rule may apply different weight to a live streaming compared to streaming to the DVR function of a CPE. Exemplary manually controlled rules could include changing weight of the network from DOCSIS-based delivery to digital cable delivery, if DOCSIS bandwidth becomes unavailable due to network outage.

Accordingly, the GSRM of the present invention addresses such deficiencies by receiving data from the NOC 306, which may run for example on a BSA server or switching device located at a network hub, or at the headend 150; this data in one embodiment relates to the revenue and cost implications regarding the BSA portion of the network, such as the incremental cost/benefit of instantiating a new broadcast program stream with advertising or promotions targeted to one or more particular subscribers. In the exemplary embodiment, the GSRM 302 of the present invention treats network resources to some degree as a pool, with bandwidth allocation being available for example from broadcast QAMs, from the VOD server(s), or even from other sources. These assets may be managed globally (versus on a per-portion, independent basis), so that revenue and cost are optimized across the network as a whole. For example, the GSRM 302 may in one instance during bandwidth-limited operations be faced with the decision of whether to allocate remaining available bandwidth to a new VOD session with a certain incremental cost/revenue implication (and perhaps steering the new request to an existing program stream that has a suitable correlation to the requesting subscriber's demographics or psychographics), or alternatively to instantiating one or more broadcast switched program streams with targeted advertising. The NOC 306 can in such a case pass the requisite cots/benefit information to the GSRM 302, the latter which can also evaluate the cost/benefit of the requested VOD stream(s), and determine which of the options is more optimal from a revenue standpoint.

Conversely, there may be situations where the revenue/business/operational considerations associated with one delivery paradigm (e.g., VOD) may be different that those associated with another (e.g., broadcast switched). Accordingly, substantially independent optimization of these different segments of the network may provide better results. In one such variant, the GSRM performs optimization of the on-demand delivery functions as previously described here, while the NOC 306 optimizes the broadcast delivery portion(s). In the case where there is competition for remaining resources (e.g., where both the NOC and GSRM are vying for all or a portion of the remaining bandwidth, and both needs cannot be serviced with the bandwidth that remains), the GSRM utilizes a contention resolution process to decide which of the two (or more) requests should be serviced, and in what fashion. Potential outcomes to this contention resolution process may be to (i) service one request or the other entirely, and not service the lower priority request; (ii) partial servicing of both requests.

In the context of the prior example, consider the case where the NOC determines that the revenue opportunities associated with a given subscriber who has just tuned to a broadcast channel justify instantiating a new broadcast stream with user-specific or targeted advertising for that subscriber. The NOC would then submit a bandwidth request to the GSRM, which would then compare the request (and bandwidth required to service the request) with (i) the available remaining bandwidth open for allocation, and (ii) other competing requests if bandwidth is limited. The GSRM may decide that a VOD session request has better revenue implications, especially since the requested BSA stream already exists (albeit with non-targeted advertising for the subscriber who just tuned in). The VOD service request would therefore be grated and a session instantiated, and the requesting BSA subscriber tuned to the existing broadcast program stream.

Figure 3B:
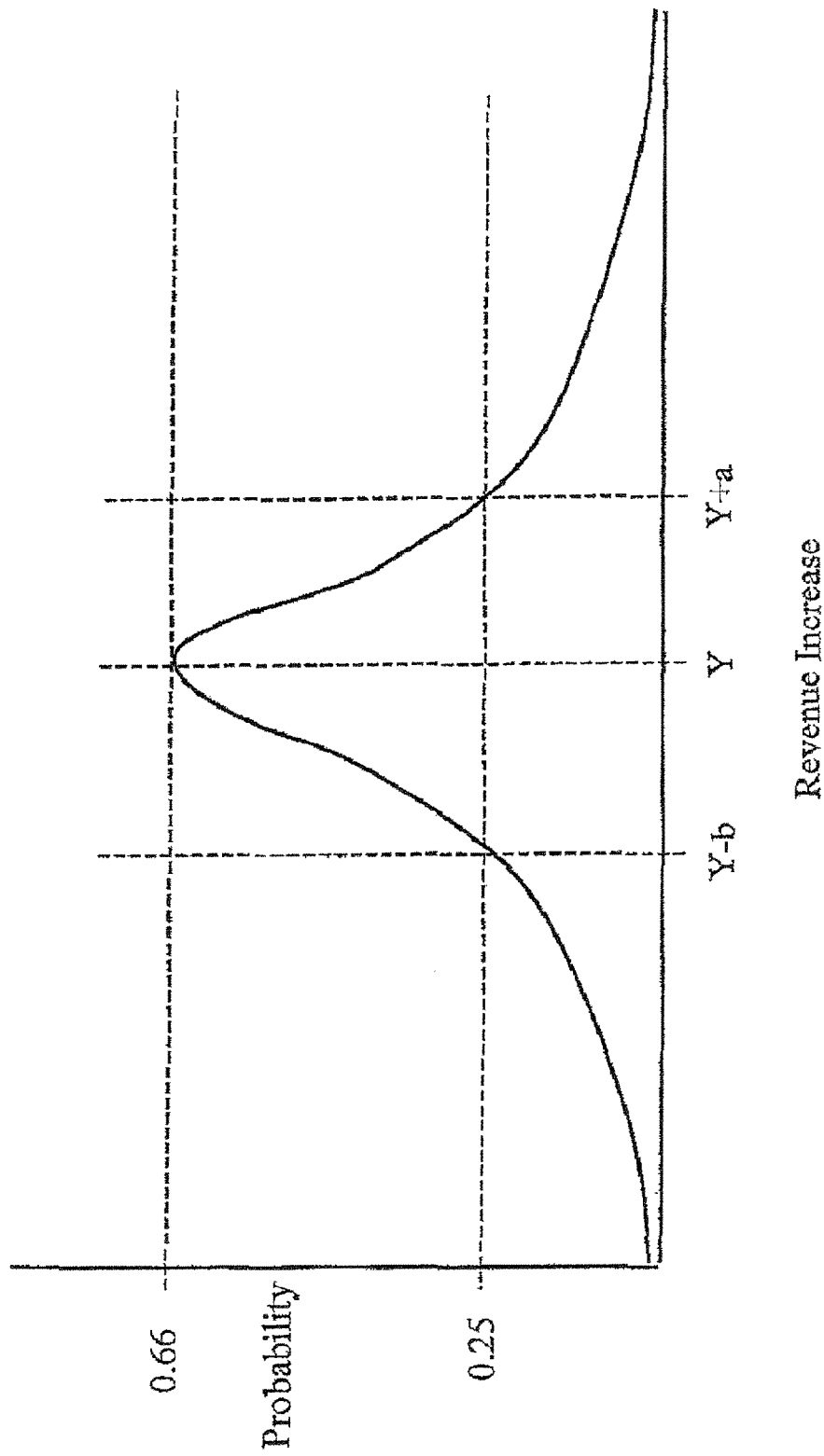
FIG. 3B is a graph illustrating one exemplary embodiment of a statistical revenue distribution useful with the present invention.

In a simple example of the foregoing, the information obtained from the NOC 304 may indicate that servicing the request by instantiating a new BSA program stream would "cost" the network X amount of bandwidth, and cost little if any bandwidth or other resources (assume zero) if the request was serviced by an existing stream. The information obtained might further indicate that if a new stream is instantiated for the request, net revenue to the network has a mean or median probability of 0.66 (66% chance) of increasing revenue by Y, a 0.25 (25%) probability of increasing revenue by Y+a, and so forth (see FIG. 3B). Similarly, the net revenue effect of not instantiating the new stream, and servicing it with an existing stream would be say zero with respect to that stream, but the "saved" bandwidth could then be used to service a VOD request which has a given (assume deterministic) revenue benefit of Z. Hence, the GSRM evaluation and selection processes would effectively decide whether it was better to instantiate the new stream at a cost of X bandwidth in order to obtain a likelihood of increased revenue according to FIG. 3B, and ostensibly at a revenue cost of Z (due to the "lost" VOD stream). Depending for example on the relationship between Y and Z, and if bandwidth is tightly constrained, the aforementioned tradeoff between Y and Z could be evaluated according to e.g., a prescribed algorithmic rule imposed by the MSO (e.g., if constrained and Y>Z by n percent, then instantiate new BSA stream; otherwise, do not instantiate and use the bandwidth for a VOD session). It will be appreciated that much more intricate algorithms may be developed and applied by the MSO, including those taking into account the aforementioned statistical distribution of revenue probability shown in FIG. 3B.

Alternatively, as previously referenced herein, statistically-based or discrete models need not be used; rather, the decision logic may comprise e.g., Boolean logic, Bayesian or Dempster-Schaefer logic, fuzzy logic (e.g., variable values such as "high revenue", "medium revenue", "low revenue", etc.) of the type well known to those of ordinary skill in the mathematical and computer logic arts. Hence, the MSO can advantageously make its implementation as detailed or simplistic as it desires, and even dynamically alter the rule sets applied under different operational or business climates. For instance, a first rule set might be imposed during normal operation, and a second rule set during maintenance or equipment failure periods. Or, a first rule set could be applied during prime-time, and different rule sets during other periods. As yet another alternative, different rule sets could be applied during different holidays (or holiday season, such as the "Christmas rule set"), which are different than the normal rule sets. An almost limitless number of different rule sets and permutations are possible under the present invention.

Note also that the GSRM 302 can be configured to re-evaluate competing requests after the allocation decision has been made. For instance, in the prior example, the GRSM might re-evaluate whether a new targeted BSA stream should be instantiated and the BSA subscriber switched to that new stream periodically, or when an event occurs (e.g., additional bandwidth is projected to exist for a sufficient period of time, or the aforementioned competing VOD session is terminated). In this fashion, the GSRM is not "stuck" with its allocation decision under dynamic network resource circumstances. Accordingly, decisions can be altered mid-stream, subject in the exemplary embodiment to the caveat that service to a given subscriber is not interrupted or appreciably degraded. For example, the GSRM may be programmed to inhibit termination of a VOD session of BSA stream mid-program, or switching a subscriber from HD to SD (without upconversion) mid-stream, etc.). Such protective rules and policies can be readily programmed into the GSRM so as to maintain subscriber satisfaction at the highest possible level while also optimizing business/revenue/operational considerations.

The exemplary Global Session Resource Manager (GSRM) arbitrates bandwidth and even other resource usage between services based on one or more of the following criteria: (i) direct or indirect revenue or profit; (ii) cost of delivering the service, (iii) desire to maintain optimal loading balancing and operational efficiency where compatible with maximized revenue/profit, and (iv) the best possible subscriber experience and convenience.

Due to the unique consolidation of information, available to the GSRM, the GSRM can determine the most optimal combination of network resources and programming. In some cases, the GSRM may even decide to discontinue or gradually "migrate" currently constrained usage, in favor of a more profitable service option.

In another aspect of the invention, the aforementioned GSRM (e.g., rendered as one or more computer programs) optionally includes an operations rules engine. The rules engine can be considered an overlay of sorts to the business-oriented algorithms of the GSRM 302 or NOC 304 previously described. Specifically, the GSRM process may invoke certain operational protocols or decision processes based on data received from the CPE 106 (e.g., historical activity data, CPE configuration, logged errors, etc.), as well as network operational or historical data, demographic data, geographic data, etc. However, these processes may not always be compatible with operational goals, such as system reliability, robustness, flexibility and user experience. Moreover, the exemplary NOC 304 where used may be operating on a per-CPE or per-request basis (i.e., evaluating each individual request effectively in isolation, and generating a decision or recommendation without considering larger patterns or decisions being made in the service group or network as a whole).

Hence, when imposed, the operational rules can be used to dynamically (or manually) control the operation of the GSRM 302, in conjunction with the operational "recommendations" generated by the GSRM and NOC 304 as part of the revenue/profit optimization functions previously described.

For example, one rule implemented by the rules module may comprise selectively precluding existing sessions from being terminated mid-stream as previously described. Another rule might prevent an HD to SD transition for a session under way; i.e., to prevent a subscriber from perceiving a significant degradation of visual quality during the middle of a program. Yet another rule might override a GSRM session allocation decision or recommendation so as to maintain a desired bandwidth margin for an incipient or expected bandwidth transient (excursion).

As another example, the failure of a network component, or loss of a content source, might render certain options unachievable (or at least undesirable due to factors such as high cost burden, high delivery latency, poor video quality, etc.). Hence, the rules engine can in such cases be used to mask the affected options or inputs to the GSRM or NOC algorithm during the affected periods of time.

Any number of other operational rules may be imposed via the rules module of the GSRM.

It will also be appreciated that the decisions generated by the GSRM (and NOC) cost/benefit analysis can be manually or semi-manually utilized by network operators, such as in the form of a recommendation rather than a hard and fast decision point. For instance, the GSRM 302 may present a recommended choice or bandwidth allocation to a human operator, thereby letting the operator decide whether to implement it. This variant of the invention allows for the intangible but often important "gut feeling" or intrinsic knowledge of the operator to be factored into the decision process. The operator may also be able to identify trends or patterns in network operation that the GSRM, NOC or rules engine cannot, such as the topical popularity of a given VOD content, in effect allowing the operator to override the GSRM when his/her knowledge or intuition says that a different course should be followed.

QAM Loading For Revenue/Efficiency—

In another embodiment of the invention, the aforementioned cost/benefit optimization functionality is supplemented by the ability to "pack" heterogeneous program streams (e.g., HD and SD programs) based on one or more considerations. For example, in one embodiment, different candidate program streams (session requests) are evaluated in terms of revenue/profit and cost implications as previously described. The placement of these streams when selected within one or more downstream QAMs (transports) may be guided by bandwidth utilization efficiency; i.e., getting the most sessions within the available QAMs. See, e.g., the exemplary methods and apparatus of co-owned and co-pending U.S. patent application Ser. No. 10/881,979 filed Jun. 29, 2004 and entitled "METHOD AND APPARATUS FOR NETWORK BANDWIDTH ALLOCATION", previously incorporated herein, which "intelligently" allocates bandwidth according to multiple different service levels or data rates. This allocation scheme achieves multiple goals, including (i) increasing the likelihood of having the capacity to provide HD bandwidth within a Service Group to an HD VOD session request, and (ii) minimizing the chances of stranding bandwidth within a channel or service group. Specifically, load balancing across QAMs is used, as well as maximizing HD session support through use of Least-Loaded and Most-Loaded allocation algorithms in conjunction with a plurality of user-definable variables which control operation of the session resource manager (SRM).

Network resources are treated as a "floating pool" which can be dynamically allocated in order to optimize the desired variables.

Additionally, the aforementioned floating pool approach can be used for optimization on a revenue or profit basis, which may not yield the same allocation as a purely operational (e.g., bandwidth utilization or efficiency) approach. Stated differently, bandwidth optimization may strand less bandwidth and provide more opportunities for HD content delivery, but may yield less revenue or profit for the MSO than other schemes which directly take such revenue or profitability into account.

Figure 4A:
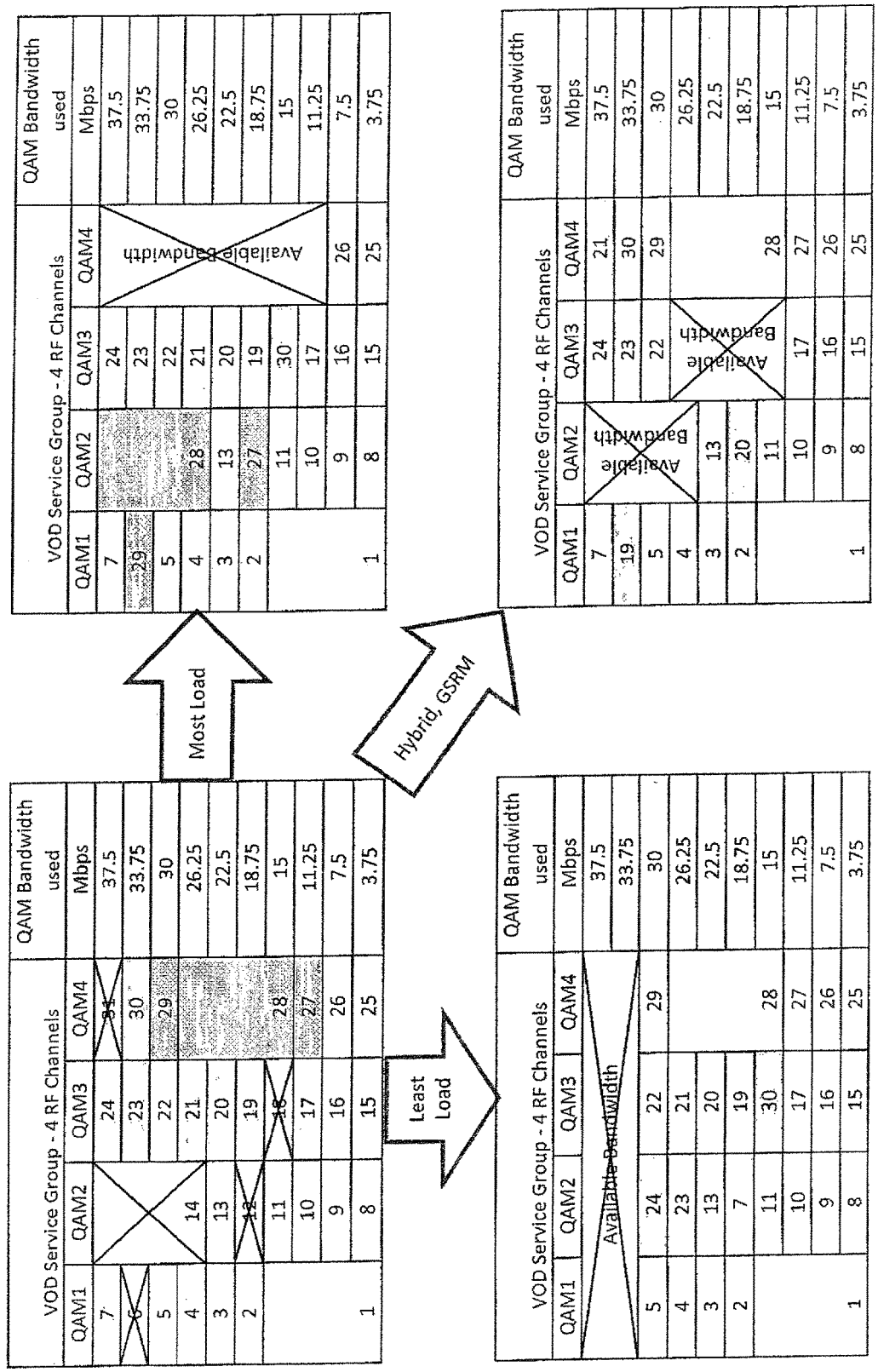
FIG. 4A illustrates an exemplary session allocation resulting from applying one embodiment of the GSRM packing algorithm of the invention to VOD session requests.

Exemplary use of such QAM packing algorithms is illustrated in FIG. 4A. FIG. 4A illustrates QAM allocations after an initial complete allocation. At this point, the SRM has 1 HD (14) session which has been discontinued, and 4 SD (6, 12, 18, 31) sessions which are discontinued. Two sample diagrams for bandwidth reaping processes and migrations based on the most-loaded and least-loaded algorithms are shown in FIG. 4A. In this example, the GSRM 302 assigns a high priority to maintaining a sufficient bandwidth for future HD session requests; a second weighted priority is assigned to evening out the distribution of HD programming across multiple QAM channels. In the illustrated circumstance, the GSRM has enabled two additional HD session network revenue opportunities, while maintaining the desired level of network stability by way of distributed loading. The ability of the GSRM to have fine control over service group allocations advantageously allows the network provider greater control over content delivery, and robustness.

FIG. 4B demonstrates how a GSRM can "trump" or replace a session for better revenue possibilities. In this diagram, sessions 11, 13 and 31 have been allocated initially, but are now unused and free for reallocation. A new HD subscriber represents a better revenue possibility, so the GSRM migrates or "juggles" SD sessions 15, 16, and 17. Session 18 is completely removed. In either case, the new HD programming potentially offers a better revenue than the original SD session 18. The session 18 might comprise an FVOD session for example, the removal of which will have little impact on subscriber satisfaction. Alternatively, one or more HD sessions (e.g., 14, 28) could be reduced to SD upconversion if their CPE is so equipped in order to make room for session 18 on one of the QAMs in that service group.

In the previous example of FIG. 4B, it is assumed that HD programming is more lucrative than SD programming, but the inverse could be true as well (i.e., HD is less profitable than SD). One example case of this exists when a demographic, psychographic, or geographic segment of the network preferentially selects SD programming rather than pay for HD level fidelity. In this case, HD programming might be offered, but would be cannibalized to offer more SD level broadcasts during SD saturation periods.

Wideband Variants—

As previously noted, under prevailing network and CPE design practices, the bandwidth required by a video stream cannot be spread over two QAM carriers. For example, when a new HDVOD session request is granted, all 15 Mbps of bandwidth must be made available on a single QAM carrier. However, one variant of the present invention utilizes a wideband modulator and tuner arrangement whereby content associated with a given program stream can be distributed over two or more QAMs. See, e.g., co-pending and co-owned U.S. patent application Ser. No. 11/013,671 entitled "METHOD AND APPARATUS FOR WIDEBAND DISTRIBUTION OF CONTENT" filed Dec. 15, 2004, which is incorporated herein by reference in its entirety, for one exemplary implementation of such a wideband arrangement. Accordingly, when such a feature is used in conjunction with the present invention, the GSRM or other responsible process can optionally evaluate the various resource allocation options both according to a single-QAM model and a wideband (multi-QAM) model when determining the business and/or operation ramifications of each option. As a simple example, more efficient bandwidth utilization may be obtainable by spreading an HD program stream across two or more QAMs (versus only one) in that less bandwidth may be "stranded". This reduction in stranded bandwidth might tip the economic/operational balance towards one allocation option versus another. Myriad other applications of this general approach will be recognized by those of ordinary skill as well.

Network Server—

Figure 5:
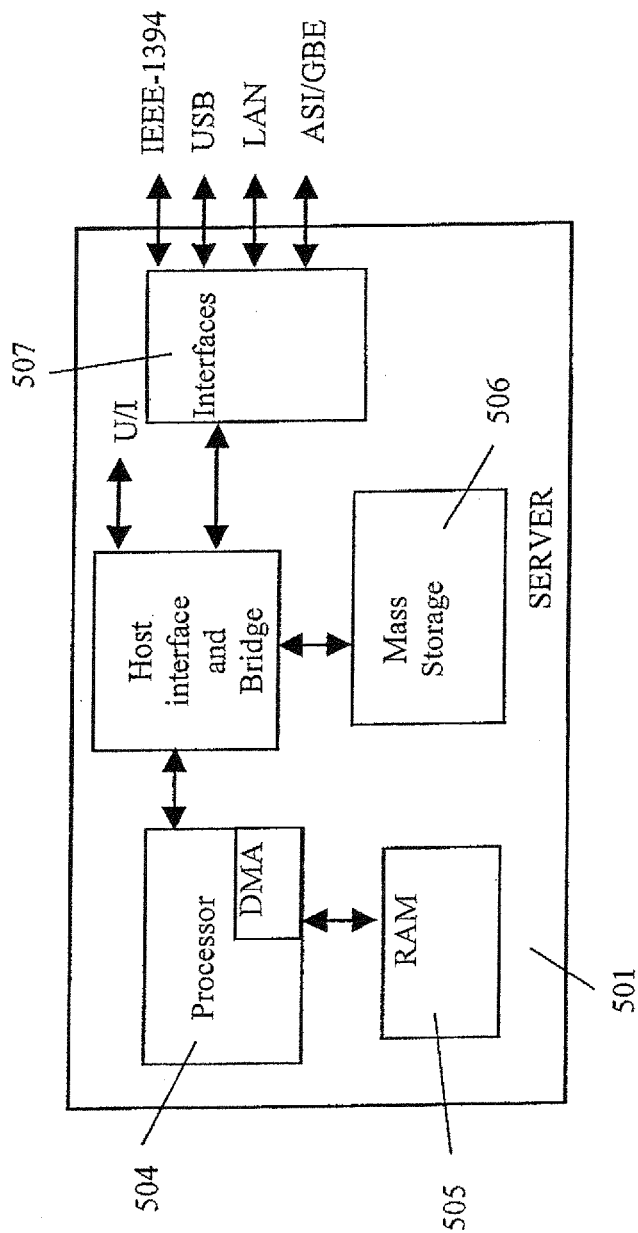
FIG. 5 is a functional block diagram illustrating one embodiment of an exemplary network (VOD) server device incorporating the GSRM revenue/profit optimization functionality according to the invention.

Referring now to FIG. 5, one embodiment of an improved network (e.g., VOD server) device with GSRM functionality according to the present invention is described. As shown in FIG. 5, the device 501 generally comprises and OpenCable-compliant VOD server module adapted for use at the headend 150 of FIG. 1, although the server may comprise other types of devices (e.g., BSA or application servers) within the network as previously described, including those at the hub sites.

The device 501 comprises a digital processor(s) 504, storage device 506, and a plurality of interfaces 507 for use with other network apparatus such as RF combiners, IP routers and other packet network devices, network management and provisioning systems, local PCs, etc. Other components which may be utilized within the network device 501 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data interchange between the network device 501 and the CPE 106, and between the GSRM 302 and the NOC 306 if used. The GSRM software portion 302 of FIG. 3 is also disposed to run on the server module 501, and can be configured to provide a functional interface with the client processes 304 on the network CPE 106 (where used), or other interposed or remote entities. These components and functionalities are well known to those of ordinary skill in the cable and embedded system fields, and accordingly not described further herein.

The device 501 of FIG. 5 may take any number of physical forms, comprising for example one of a plurality of discrete modules or cards within a larger network headend or hub device of the type well known in the art. The server may also comprise firmware, either alone or in combination with other hardware/software components such as those previously described. Alternatively, the device 501 may be a stand-alone device or module disposed at the headend, hub or other site, and may even include its own RF front end (e.g., modulators, encryptors, etc.) or optical interface so as to interface directly with various portions of the HFC network 101. Numerous other configurations may be used. The device 501 may also be integrated with other types of components (such as satellite transceivers, encoders/decoders, etc.) and form factors if desired.

As yet another example, portions of the GSRM functionality may be rendered as a dedicated or application specific IC having code running thereon. Myriad different configurations for practicing the invention will be recognized by those of ordinary skill in the network arts provided the present disclosure.

CPE—

Figure 6:
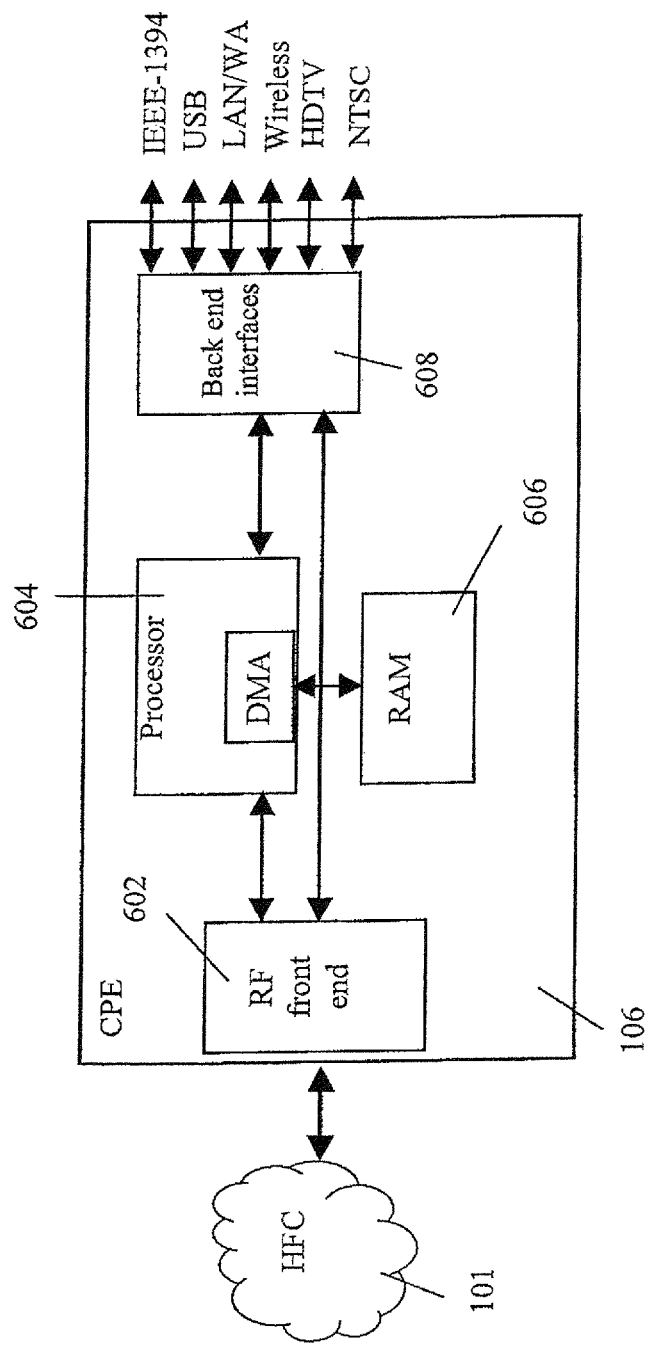
FIG. 6 is a functional block diagram illustrating one embodiment of an exemplary network CPE incorporating a client portion of the GSRM process according to the invention.

FIG. 6 illustrates an exemplary embodiment of the improved CPE 106 according to the present invention. As shown in the simplified diagram of FIG. 6, the device 106 generally comprises and OpenCable (OCAP)-compliant embedded system having an RF front end 602 (including tuner and demodulator/decryptors) for interface with the HFC network 101 of FIG. 1, digital processor(s) 604, storage device 606, and a plurality of interfaces 608 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 6 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 6 is also provided with an OCAP 1.0-compliant application and Java-based middleware which, inter alia, manages the operation of the device and applications running thereon (including the GSRM client process 304 where used). It will be recognized by those of ordinary skill that myriad different device and software architectures may be used consistent with the functions of the present invention, the device of FIG. 6 being merely exemplary. For example, different middleware (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the GSRM client process 304 and any necessary data requirements of the GSRM 302 (such as information on hardware or application status, tuner status, TUNER ID, MAC, or even historical data such as use or tuning history.

In another embodiment, the CPE 106 comprises a converged premises device, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety.

Moreover, the foregoing embodiments of the CPE 106 may utilize any number of other methods and apparatus in conjunction with the functionality previously described herein in order to further extend its capabilities. See, e.g., co-owned and co-pending U.S. patent application Ser. No. 10/723,959 filed Nov. 24, 2003 entitled "METHODS AND APPARATUS FOR HARDWARE REGISTRATION IN A NETWORK DEVICE"; U.S. patent application Ser. No. 10/773,664 filed Feb. 6, 2004 entitled "METHODS AND APPARATUS FOR DISPLAY ELEMENT MANAGEMENT IN AN INFORMATION NETWORK", and U.S. patent application Ser. No. 10/782,680 filed Feb. 18, 2004 entitled "MEDIA EXTENSION APPARATUS AND METHODS FOR USE IN AN INFORMATION NETWORK", each of the foregoing incorporated herein by reference in its entirety. Myriad other combinations and variations of the CPE 106 will also be recognized by those of ordinary skill given the present disclosure.

The exemplary CPE 106 may further comprise its own indigenous revenue/profit optimization application as part of the GSRM client process 304, which allows a user to manage his optimization related preferences and selections, especially with respect to actual monetary cost incurred by his/her viewing habits and selections. Such management includes, but is not limited to, the ability to view cost optimization options to fulfill a session or program viewing request, and the ability to select from among these options. For example, the aforementioned CPE application program may, upon instantiation of a GUI (e.g., an on-screen display window with menu, as previously described), allow the window to display the relative costs of the different displayed options in relation to that particular subscriber's monthly bill or other useful metric. One such menu or display might advise the user that selection of a VOD program for delivery in HD will add $X to the subscriber's monthly bill.

As previously described, in the case of wideband (i.e., multiple QAM) delivery of content, the CPE 106 can also be outfitted with a wideband tuner so as to enable the CPE 106 to receive the various portions of the content across two or more QAMs and decode/assemble this content into a single program stream for viewing by the subscriber.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method of operating a content delivery network having a plurality of consumer premises equipment (CPE) associated therewith, said method comprising:
   receiving a request for delivery of on-demand content from one of said plurality of CPE of said network, the request generated substantially in response to a user input provided via said one of said plurality of CPE;
   determining, responsive to said received request, that there is insufficient bandwidth to deliver said on-demand content concurrent with one or more other requests for content received from others of said plurality of CPE;
   based at least on said act of determining, evaluating a first profit consideration relating to said network, said at least one profit consideration comprising at least a temporal evaluation of said on-demand content associated with said request as compared to content associated with said one or more other requests;
based at least on said acts of determining and evaluating, further evaluating at least two possible delivery options for servicing said request, said act of further evaluating being performed based at least in part on a second profit consideration relating to said network; and
based at least in part on said act of evaluating, selecting and performing one of said at least two possible delivery options in order to service said request, said act of performing said one delivery option comprising allocating bandwidth to said request;
wherein said received request comprises a lower revenue and shorter duration content item relative to said one or more other requests.

2. The method of claim 1, wherein said at least two possible delivery options comprise: (i) delivery of a high definition (HD) version of said requested on-demand content; and (ii) a standard definition (SD) version of said requested on-demand content.

3. The method of claim 1, wherein said act of further evaluating is performed via a supervisory session resource management process of said network.

4. The method of claim 1, wherein said act of further evaluating based on at least said second profit consideration comprises:
performing a revenue analysis for each of said at least two possible delivery options; and
selecting an option having an optimal revenue.

5. The method of claim 1, wherein said act of further evaluating based at least on said second profit consideration comprises evaluating based on at least one demographic associated with a subscriber of said requesting one of said plurality of CPE.

6. The method of claim 3, wherein said supervisory session resource management process is further configured to, based at least in part on said further evaluation, utilize at least one of a most-loaded and least-loaded allocation algorithm in order to service said request.

7. The method of claim 1, wherein said temporal evaluation comprises evaluation of a duration of required use of resources for request servicing versus a profit benefit of request servicing.

8. The method of claim 1, wherein said temporal evaluation is performed by a computer program operative to run on a server in data communication with said content delivery network.

9. The method of claim 1, wherein said temporal evaluation comprises accessing a source data structure relating profitability to one or more of duration of content or bandwidth consumption based on duration.

10. A method of operating a content delivery network having a plurality of client devices associated therewith, said method comprising:
receiving from first ones of said plurality of client devices a plurality of requests for delivery of a first content element;
receiving from second ones of said plurality of client devices a plurality of requests for delivery of a second content element;
evaluating a profitability associated with servicing said plurality of requests for said first content in either of a first format or a second format, and a profitability associated with servicing said plurality of requests for said second content in either of said first format or said second format, said first format comprising a standard definition (SD) format, and said second format comprising a high definition (HD) format;
assembling at least one transport using said first content in one of said first or second formats, and said second content in one of said first or second formats, based at least in part on said act of evaluating;
determining that at least one of said first ones of said plurality of client devices or said second ones of said plurality of client devices comprises an SD upconversion capability; and
based at least in part on said determination, delivering said requested first or second content to said ones of said plurality of client devices comprising said upconversion capability in said SD format.

11. The method of claim 10, wherein said act of assembling based at least in part on said act of evaluating comprises assembling said at least one transport so as to maximize said profitability.

12. The method of claim 11, wherein said at least one transport comprises a multiplexed quadrature amplitude modulated (QAM) radio frequency carrier.

13. The method of claim 11, further comprising evaluating said at least one assembled transport for bandwidth efficiency.

14. A method of operating a content delivery network according to a resource allocation model when available resources of said content delivery network are constrained due to existing requests for service, the method comprising:
receiving a request for digitally rendered content;
identifying first data relating to one or more network costs for delivery of said requested digitally rendered content;
identifying second data relating to one or more network benefits for delivery of said requested digitally rendered content;
accessing historical content usage data for a geographic region of request origination, said historical content usage data for said geographic region of request origination comprising data indicative of a historically low usage of high definition (HD) content relative to a prescribed HD usage standard;
evaluating one or more requested content revenue conditions, said one or more requested content revenue conditions comprising at least a revenue condition related to said geographic region of request origination;
deriving a cost/benefit metric based at least on said first data relating to one or more network costs, said second data relating to one or more network benefits, and said evaluated one or more requested content revenue conditions; and
delivering said requested content based at least on a higher ranking of said cost/benefit metric relative to one or more other cost/benefit metrics for each of one or more other requests for digitally rendered content.

15. The method of claim 14, wherein said operating is performed via a session resource manager (SRM) computerized process of said network.

16. The method of claim 14, further comprising ranking said cost/benefit metric against a plurality of other cost/benefit metrics for respective ones of other content requests.

17. The method of claim 14, further comprising evaluating one or more network conditions, and further deriving said cost/benefit metric based at least on said one or more network conditions.

18. The method of claim 17, wherein said one or more network conditions comprise a time of day.

19. The method of claim 14, wherein said first data relating to one or more network costs comprises one or more of (i) a lost advertising revenue, and/or (ii) an amount of processing overhead.

20. The method of claim 14, wherein said second data relating to one or more network benefits comprises one or more of (i) direct incremental revenue from a user, and/or (ii) direct incremental revenue from an advertiser.

21. The method of claim 14, wherein said evaluating of said one or more requested content revenue conditions comprises determining a higher revenue condition for delivery of standard definition (SD) content relative to a lower revenue condition for delivery of HD content based at least in part on said historically low usage of high definition (HD) content relative to said prescribed HD usage standard.

22. The method of claim 21, wherein said delivering said requested content comprises delivering said requested content in an SD format.

23. The method of claim 14, further comprising determining a subscription tier associated with a user device from which said request for digitally rendered content was issued, said determined subscription tier being a higher revenue subscription tier relative to one or more other subscription tiers.

24. The method of claim 23, wherein said one or more requested content revenue conditions further comprising at least another revenue condition related to said determined subscription tier;
said evaluating of said one or more requested content revenue conditions comprises determining a lower revenue condition for delivery of SD content relative to a higher revenue condition for delivery of HD content based at least in part on said higher revenue subscription tier; and
said delivering said requested content comprises delivering said requested content in an HD format.

25. A method of operating a content delivery network having a plurality of client devices associated therewith, said method comprising:
receiving a first computerized request for delivery of on-demand digitally rendered content from one of said plurality of client devices via said network, the request generated substantially in response to a user input provided via a computerized user interface associated with said one of said plurality of client devices;
determining, responsive to said received first computerized request, that there is insufficient network bandwidth to deliver said on-demand content to at least said one client devices concurrent with servicing a plurality of existing requests from others of said plurality of client devices via said network, said first computerized request being a request which produces a higher revenue than said plurality of existing requests;
based at least on said determining, evaluating at least two possible delivery options for servicing said first computerized request, said act of evaluating being performed based at least in part on at least one profit consideration relating to delivery of said digitally rendered content via a first of said delivery options versus delivery of said digitally rendered content via a second of said delivery options; and
based at least in part on said act of evaluating, selecting and performing one of said first and second delivery options in order to service said first computerized request,
wherein said performing one of said first and second delivery options in order to service said first computerized request comprises reconfiguring at least a portion of said network so as to enable servicing said first computerized request via said selected delivery option;
wherein said reconfiguring of said at least portion of said network comprises cancelling of at least one of said plurality of existing computerized requests in order to accommodate said enabling of servicing said first computerized request via said selected delivery option; and
wherein said reconfiguring of said at least portion of said network further comprises migration of one or more of said existing computerized requests in order to reserve network bandwidth for servicing of one or more future computerized requests via one or more of said at least two possible delivery options, said one or more future computerized request producing a higher revenue than said existing computerized requests.

26. The method of claim 25, wherein:
said at least one profit consideration comprises delivery of said digitally rendered content via said first delivery option with first advertising content, versus delivery of said digitally rendered content via said second delivery option with second advertising content, said first advertising content being more profitable for an operator of said content delivery network than said second content; and
said selecting and performing one of said first and second delivery options in order to service said request comprises selecting and performing said first delivery option, said performing comprising allocating bandwidth of the network to the first delivery option irrespective of bandwidth conservation.

27. The method of claim 25, wherein:
wherein said first delivery option comprises delivery of a high definition (HD) version of said requested on-demand content; and said second delivery option comprises delivery of a standard definition (SD) version of said requested on-demand content; and
said at least one profit consideration comprises evaluating a subscription level of the user associated with the request.

28. The method of claim 27, wherein:
said evaluating a subscription level of the user associated with the request indicates that the subscription level is higher than that of at least one other user associated with one of said plurality of requests of others of said client devices; and
said performing comprises delivering said HD version to the user associated with the request, and delivering an SD version of the requested on-demand content to the at least one other user.

* * * * *